(12) United States Patent
Seok

(10) Patent No.: US 9,949,290 B2
(45) Date of Patent: Apr. 17, 2018

(54) BANDWIDTH DETERMINATION FOR MULTIPLE USER TRANSMISSION IN A HIGH EFFICIENCY WIRELESS LAN

(71) Applicant: NEWRACOM, INC., Irvine, CA (US)

(72) Inventor: Yongho Seok, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 251 days.

(21) Appl. No.: 14/884,676

(22) Filed: Oct. 15, 2015

(65) Prior Publication Data

US 2016/0113009 A1 Apr. 21, 2016

Related U.S. Application Data

(60) Provisional application No. 62/064,772, filed on Oct. 16, 2014, provisional application No. 62/087,740, filed on Dec. 4, 2014.

(51) Int. Cl.
| | | |
|---|---|---|
| *H04W 74/00* | (2009.01) | |
| *H04B 7/06* | (2006.01) | |
| *H04B 7/04* | (2017.01) | |
| *H04B 7/0452* | (2017.01) | |
| *H04W 74/08* | (2009.01) | |
| *H04W 84/12* | (2009.01) | |

(52) U.S. Cl.
CPC ........ *H04W 74/006* (2013.01); *H04B 7/0452* (2013.01); *H04B 7/0697* (2013.01); *H04W 74/0816* (2013.01); *H04W 84/12* (2013.01)

(58) Field of Classification Search
CPC ............... H04B 7/0452; H04B 7/0697; H04W 72/0446
See application file for complete search history.

(56) References Cited

U.S. PATENT DOCUMENTS

| | | | | |
|---|---|---|---|---|
| 2009/0180430 A1* | 7/2009 | Fadell | ................ | H04L 12/5695 370/329 |
| 2009/0310619 A1* | 12/2009 | Brommer | .............. | H04J 3/1682 370/449 |
| 2011/0090855 A1* | 4/2011 | Kim | ..................... | H04B 7/0452 370/329 |
| 2012/0177017 A1* | 7/2012 | Gong | ................ | H04W 74/0816 370/338 |
| 2015/0131508 A1* | 5/2015 | Merlin | .............. | H04W 52/0216 370/311 |
| 2016/0066318 A1* | 3/2016 | Pereira | .................. | H04L 5/0007 370/329 |
| 2016/0143018 A1* | 5/2016 | You | .......................... | H04B 7/04 370/329 |

* cited by examiner

*Primary Examiner* — Omer S Mian

(57) ABSTRACT

The present disclosure relates to a method and apparatus for determining a bandwidth for Multi-User (MU) transmission in a High Efficiency WLAN (HEW). According to one aspect of the present disclosure, a method for transmitting by a Station (STA) to an Access point (AP) an uplink Physical layer Protocol Data Unit (PPDU) frame in a WLAN may be provided. The method may include receiving a trigger frame including bandwidth information, the trigger frame eliciting a transmission of the uplink PPDU frame including a data unit of the STA and at least one data unit of at least one other STA, and transmitting the data unit of the STA in the uplink PPDU frame, based on an available bandwidth of the STA and a bandwidth indicated by the bandwidth information included in the trigger frame.

14 Claims, 23 Drawing Sheets

FIG. 11

| L-STF | L-LTF | L-SIG | HE-SIG-A | HE-STF | HE-LTF | HE-LTF | HE-LTF | HE-LTF | HE-SIG-B | PSDU(AP to STA6) |
|---|---|---|---|---|---|---|---|---|---|---|
| | | | | HE-STF | HE-LTF | HE-LTF | HE-LTF | HE-LTF | HE-SIG-B | PSDU(AP to STA5) |
| | | | | HE-STF | HE-LTF | HE-LTF | HE-LTF | HE-LTF | HE-SIG-B | PSDU(AP to STA3,STA4) |
| | | | | HE-STF | HE-LTF | HE-LTF | HE-LTF | HE-LTF | HE-SIG-B | PSDU(AP to STA1,STA2) |

FIG. 12

| L-STF | L-LTF | L-SIG | HE-SIG-A | HE-STF | HE-LTF | HE-SIG-B | HE-LTF | HE-LTF | HE-LTF | HE-LTF | HE-SIG-C | PSDU(AP to STA6) |
|---|---|---|---|---|---|---|---|---|---|---|---|---|
| | | | | HE-STF | HE-LTF | HE-SIG-B | HE-LTF | HE-LTF | HE-LTF | HE-LTF | HE-SIG-C | PSDU(AP to STA5) |
| | | | | HE-STF | HE-LTF | HE-SIG-B | HE-LTF | HE-LTF | HE-LTF | HE-LTF | HE-SIG-C | PSDU(AP to STA3, STA4) |
| | | | | HE-STF | HE-LTF | HE-SIG-B | HE-LTF | HE-LTF | HE-LTF | HE-LTF | HE-SIG-C | PSDU(AP to STA1, STA2) |

FIG. 13

| L-STF | L-LTF | L-SIG | HE-SIG-A | HE-STF | HE-LTF | HE-SIG-B | HE-LTF | HE-LTF | HE-LTF | HE-LTF | HE-SIG-C | PSDU(STA4 to AP) |
| | | | | HE-STF | HE-LTF | HE-SIG-B | HE-LTF | HE-LTF | HE-LTF | HE-LTF | HE-SIG-C | PSDU(STA3 to AP) |
| | | | | HE-STF | HE-LTF | HE-SIG-B | HE-LTF | HE-LTF | HE-LTF | HE-LTF | HE-SIG-C | PSDU(STA2 to AP) |
| | | | | HE-STF | HE-LTF | HE-SIG-B | HE-LTF | HE-LTF | HE-LTF | HE-LTF | HE-SIG-C | PSDU(STA1 to AP) |

BANDWIDTH DETERMINATION FOR MULTIPLE USER TRANSMISSION IN A HIGH EFFICIENCY WIRELESS LAN

CROSS-REFERENCE TO RELATED APPLICATIONS

This application claims the benefits of U.S. Provisional Application No. 62/064,772, filed on Oct. 16, 2014, and U.S. Provisional Application No. 62/087,740, filed on Dec. 4, 2014, which are hereby incorporated by reference as if fully set forth herein.

BACKGROUND

Technical Field

The present disclosure relates to a Wireless Local Area Network (WLAN), and more particularly, to a method, apparatus, and software for determining a bandwidth for Multi-User (MU) transmission in a High Efficiency WLAN (HEW), and a recording medium that stores the software.

Related Art

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

In recent times, to support increased numbers of devices supporting WLAN, such as smartphones, more Access Points (APs) have been deployed. Despite increase in use of WLAN devices supporting the Institute of Electrical and Electronics Engineers (IEEE) 802.11ac standard, that provide high performance relative to WLAN devices supporting the legacy IEEE 802.11g/n standard, a WLAN system supporting higher performance is required due to WLAN users' increased use of high volume content such as a ultra high definition video. Although a conventional WLAN system has aimed at increase of bandwidth and improvement of a peak transmission rate, actual users thereof could not feel drastic increase of such performance.

In a task group called IEEE 802.11ax, High Efficiency WLAN (HEW) standardization is under discussion. The HEW aims at improving performance felt by users demanding high-capacity, high-rate services while supporting simultaneous access of numerous stations in an environment in which a plurality of APs are densely deployed and coverage areas of APs overlap.

However, there is no specified method for determining a bandwidth for simultaneous transmission from a plurality of transmitters (e.g., Uplink (UL) MU transmission) in a HEW.

SUMMARY

Objects of the present disclosure is to provide a method and apparatus for determining a bandwidth for Uplink (UL) Multi-User (MU) transmission in a High Efficiency WLAN (HEW).

The objects of the present disclosure are not limited to the foregoing descriptions, and additional objects will become apparent to those having ordinary skill in the pertinent art to the present disclosure based upon the following descriptions.

In an aspect of the present disclosure, a method for transmitting by a Station (STA) to an Access point (AP) an uplink Physical layer Protocol Data Unit (PPDU) frame in a WLAN may be provided. The method may include receiving a trigger frame including bandwidth information, the trigger frame eliciting a transmission of the uplink PPDU frame including a data unit of the STA and at least one data unit of at least one other STA, and transmitting the data unit of the STA in the uplink PPDU frame, based on an available bandwidth of the STA and a bandwidth indicated by the bandwidth information included in the trigger frame.

In another aspect of the present disclosure, a method for receiving by an AP from a plurality of STAs an uplink PPDU frame in a WLAN may be provided. The method may include transmitting to the plurality of STAs a trigger frame including bandwidth information, the trigger frame eliciting a transmission of the uplink PPDU frame including a plurality of data units of the plurality of STAs, and receiving the plurality of data units of the plurality of STAs in the uplink PPDU frame, the transmission of the uplink PPDU frame being determined by each of the plurality of STAs based on an available bandwidth of the each of the plurality of STAs and a bandwidth indicated by the bandwidth information included in the trigger frame.

In another aspect of the present disclosure, an STA apparatus for transmitting an uplink PPDU frame to an AP in a WLAN may be provided. The STA apparatus may include a baseband processor, a Radio Frequency (RF) transceiver, a memory, etc. The baseband processor may be configured to receive a trigger frame including bandwidth information using the transceiver, the trigger frame eliciting a transmission of the uplink PPDU frame including a data unit of the STA and at least one data unit of at least one other STA, and to transmit the data unit of the STA in the uplink PPDU frame using the transceiver, based on an available bandwidth of the STA and a bandwidth indicated by the bandwidth information included in the trigger frame.

In another aspect of the present disclosure, an AP apparatus for receiving an uplink PPDU frame from a plurality of STAs in a WLAN may be provided. The AP apparatus may include a baseband processor, an RF transceiver, a memory, etc. The baseband processor may be configured to transmit to the plurality of STAs a trigger frame including bandwidth information using the transceiver, the trigger frame eliciting a transmission of the uplink PPDU frame including a plurality of data units of the plurality of STAs, and to receive the plurality of data units of the plurality of STAs in the uplink PPDU frame using the transceiver, the transmission of the uplink PPDU frame being determined by each of the plurality of STAs based on an available bandwidth of the each of the plurality of STAs and a bandwidth indicated by the bandwidth information included in the trigger frame.

In another aspect of the present disclosure, a software or computer-readable medium having instructions executable for an STA to transmit an uplink PPDU frame to an AP in a WLAN may be provided. The executable instructions may cause the STA to receive a trigger frame including bandwidth information, the trigger frame eliciting a transmission of the uplink PPDU frame including a data unit of the STA and at least one data unit of at least one other STA, and to transmit the data unit of the STA in the uplink PPDU frame, based on an available bandwidth of the STA and a bandwidth indicated by the bandwidth information included in the trigger frame.

In another aspect of the present disclosure, a software or computer-readable medium having instructions executable for an AP to receive an uplink PPDU frame from a plurality of STAs in a WLAN may be provided. The executable instructions may cause the AP to transmit to the plurality of STAs a trigger frame including bandwidth information, the trigger frame eliciting a transmission of the uplink PPDU frame including a plurality of data units of the plurality of STAs, and to receive the plurality of data units of the plurality of STAs in the uplink PPDU frame, the transmission of the uplink PPDU frame being determined by each of the plurality of STAs based on an available bandwidth of the each of the plurality of STAs and a bandwidth indicated by the bandwidth information included in the trigger frame.

It is to be understood that both the foregoing summarized features are exemplary aspects of the following detailed description of the present disclosure without limiting the scope of the present disclosure.

According to the present disclosure, a method and apparatus for determining a bandwidth for UL MU transmission in a HEW can be provided.

The advantages of the present disclosure are not limited to the foregoing descriptions, and additional advantages will become apparent to those having ordinary skill in the pertinent art to the present disclosure based upon the following descriptions.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 11 depicts the starting and ending points of an High Efficiency Long Training Field (HE-LTF) field in a HE PPDU frame format according to the present disclosure;

FIG. 12 depicts a High Efficiency SIGnal B (HE-SIG-B) field and a High Efficiency SIGnal C (HE-SIG-C) field in the HE PPDU frame format according to the present disclosure;

FIG. 13 depicts another example of a HE PPDU frame format according to the present disclosure;

DETAILED DESCRIPTION

Figure 1:
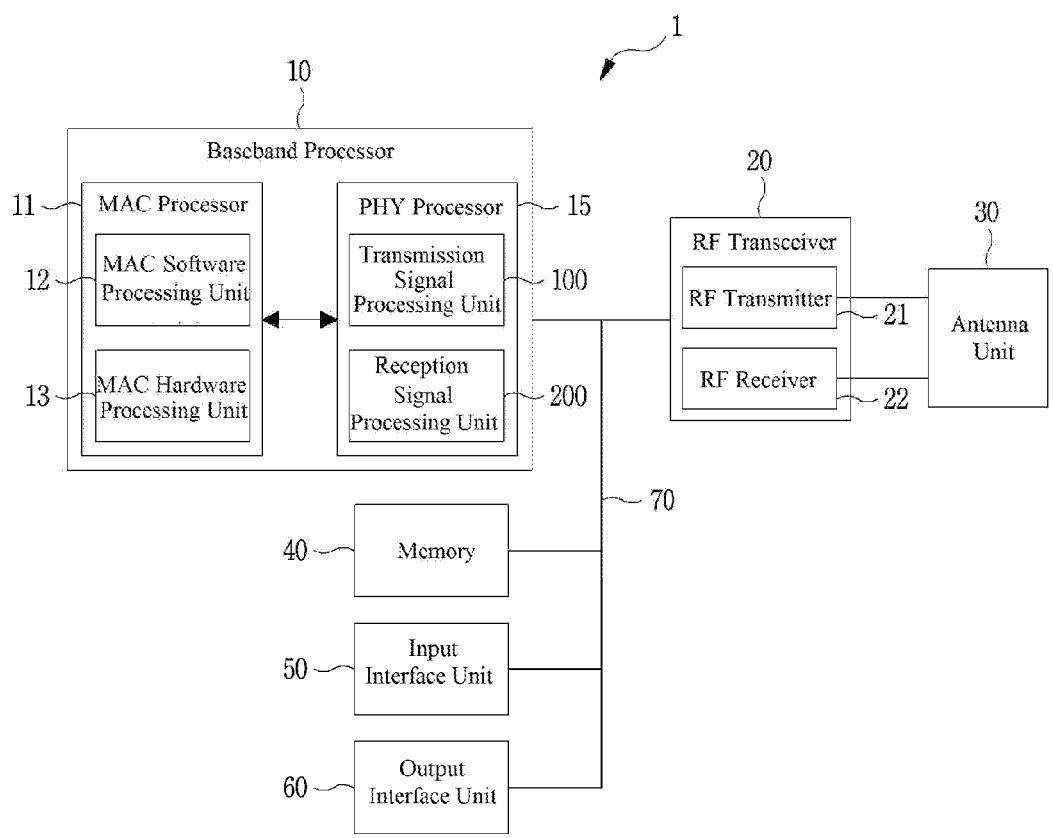
FIG. 1 is a block diagram of a Wireless Local Area Network (WLAN) device.

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In a Wireless Local Area network (WLAN), a Basic Service Set (BSS) includes a plurality of WLAN devices. A WLAN device may include a Medium Access Control (MAC) layer and a PHYsical (PHY) layer according to Institute of Electrical and Electronics Engineers (IEEE) 802.11 series standards. In the plurality of WLAN devices, at least one the WLAN device may be an Access Point (AP) and the other WLAN devices may be non-AP Stations (non-AP STAs). Alternatively, all of the plurality of WLAN devices may be non-AP STAs in an ad-hoc networking environment. In general, AP STA and non-AP STA may be each referred to as a STA or may be collectively referred to as STAs. However, for ease of description herein, only the non-AP STAs may be referred to herein as the STAs.

FIG. 1 is a block diagram of a WLAN device.

Referring to FIG. 1, a WLAN device 1 includes a baseband processor 10, a Radio Frequency (RF) transceiver 20, an antenna unit 30, a memory 40, an input interface unit 50, an output interface unit 60, and a bus 70.

The baseband processor 10 may be simply referred to as a processor, performs baseband signal processing described in the present specification, and includes a MAC processor (or MAC entity) 11 and a PHY processor (or PHY entity) 15.

In an embodiment of the present disclosure, the MAC processor 11 may include a MAC software processing unit 12 and a MAC hardware processing unit 13. The memory 40 may store software (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer as hardware (hereinafter referred to as 'MAC hardware'). However, the MAC processor 11 is not limited to the foregoing implementation examples.

The PHY processor 15 includes a transmitting (TX) signal processing unit 100 and a receiving (RX) signal processing unit 200.

The baseband processor 10, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple input Multiple Output (MIMO) or Multi-User MIMO (MU-MIMO) is used, the antenna unit 30 may include a plurality of antennas.

Figure 2:
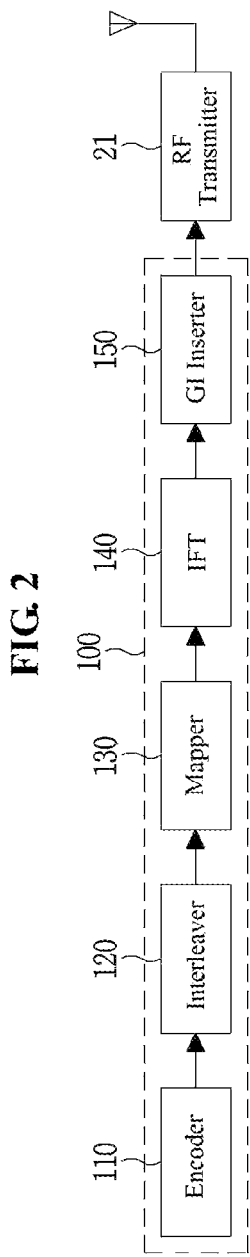
FIG. 2 is a schematic block diagram of an exemplary transmitting signal processing unit in a WLAN.

FIG. 2 is a schematic block diagram of an exemplary transmission signal processor in a WLAN.

Referring to FIG. 2, the transmitting signal processing unit 100 may include an encoder 110, an interleaver 120, a mapper 130, an Inverse Fourier Transformer (IFT) 140, and a Guard Interval (GI) inserter 150.

The encoder 110 encodes input data. For example, the encoder 110 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder 110 to change the order of bits. Interleaving may be applied only when BCC encoding is used in the encoder 110. The mapper 130 maps the sequence of bits output from the interleaver 120 to constellation points. If LDPC encoding is used in the encoder 110, the mapper 130 may further perform LDPC tone mapping in addition to constellation mapping.

When MIMO or MU-MIMO is used, the transmitting signal processing unit 100 may use a plurality of interleavers 120 and a plurality of mappers 130 corresponding to the number of spatial streams, $N_{SS}$. In this case, the transmitting signal processing unit 100 may further include a stream parser for dividing outputs of the BCC encoders or output of the LDPC encoder into blocks that are sent to different interleavers 120 or mappers 130. The transmitting signal processing unit 100 may further include a Space-Time Block Code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of constellation points output from the mapper 130 or the spatial mapper to a time-domain block (i.e., a symbol) by using Inverse Discrete Fourier Transform (IDFT) or Inverse Fast Fourier Transform (IFFT). If the STBC encoder and the spatial mapper are used, the IFT 140 may be provided for each transmit chain.

When MIMO or MU-MIMO is used, the transmitting signal processing unit 100 may insert Cyclic Shift Diversities (CSDs) to prevent unintentional beamforming. The CSD insertion may occur before or after IFT. The CSD may be specified per transmit chain or may be specified per space-time stream. Alternatively, the CSD may be applied as a part of the spatial mapper.

When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 3:
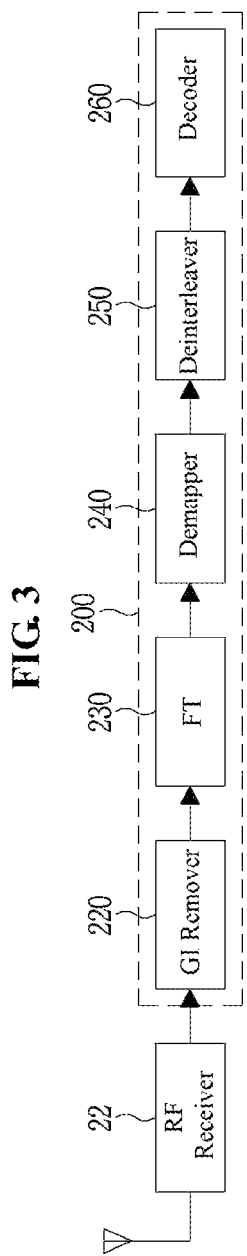
FIG. 3 is a schematic block diagram of an exemplary receiving signal processing unit in a WLAN.

FIG. 3 is a schematic block diagram of an exemplary a receiving signal processor in a WLAN.

Referring to FIG. 3, the receiving signal processing unit 200 includes a GI remover 220, a Fourier Transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time-domain block) into a block of constellation points by using a Discrete Fourier Transform (DFT) or a Fast Fourier Transform (FFT). The FT 230 may be provided for each receive chain.

When MIMO or MU-MIMO is used, the receiving signal processing unit 200 may include a spatial demapper for converting Fourier Transformed receiver chains to constellation points of the space-time streams, and an STBC decoder for despreading the constellation points from the space-time streams into the spatial streams.

The demapper 240 demaps the constellation points output from the FT 230 or the STBC decoder to bit streams. If LDPC encoding is applied to the received signal, the demapper 240 may further perform LDPC tone demapping before constellation demapping. The deinterleaver 250 deinterleaves the bits of each stream output from the demapper 240. Deinterleaving may be applied only when a BCC encoding scheme is applied to the received signal.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, shortly as a 'listen before talk' access mechanism. According to the CSMA/CA mechanism, an AP and/or a STA may sense a medium or a channel for a predetermined time before starting transmission, that is, may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in minimizing collisions.

Figure 4:
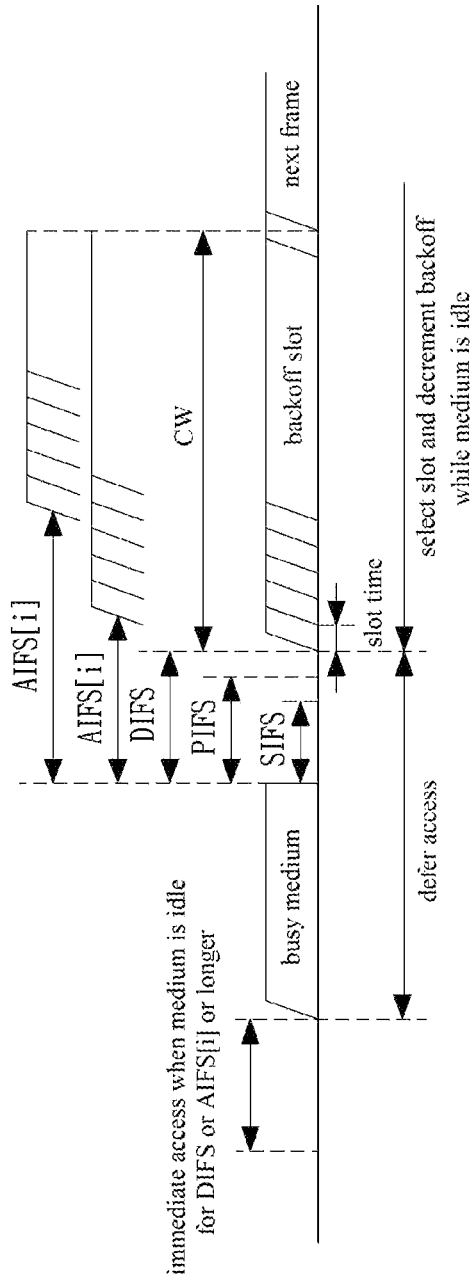
FIG. 4 depicts a relationship between InterFrame Spaces (IFSs)

FIG. 4 depicts a relationship between InterFrame Spaces (IFSs).

WLAN devices may exchange data frames, control frames, and management frames with each other.

A data frame is used for transmission of data forwarded to a higher layer. The WLAN device transmits the data frame after performing backoff if a Distributed Coordination Function IFS (DIFS) has elapsed from a time when the medium has been idle. A management frame is used for exchanging management information which is not forwarded to the higher layer. The WLAN device transmits the management frame after performing backoff if an IFS such as the DIFS or a Point Coordination Function IFS (PIFS) has elapsed. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. In the case that the control frame is not a response frame to another frame, the WLAN device transmits the control frame after performing backoff if the DIFS has elapsed. In case that the control frame is a response frame to another frame, the WLAN device transmits the control frame without performing backoff if a Short IFS (SIFS) has elapsed. The type and subtype of a frame may be identified by a type field and a subtype field in a Frame Control (FC) field.

On the other hand, a Quality of Service (QoS) STA transmits a frame after performing backoff if an Arbitration IFS (AIFS) for an associated Access Category (AC), i.e., AIFS[i] (i is determined based on AC) has elapsed. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium gets idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempt transmission. The random backoff count is determined based on a Contention Window (CW) parameter and the medium is monitored continuously during count-down of backoff slots (i.e. decrement a backoff countdown) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
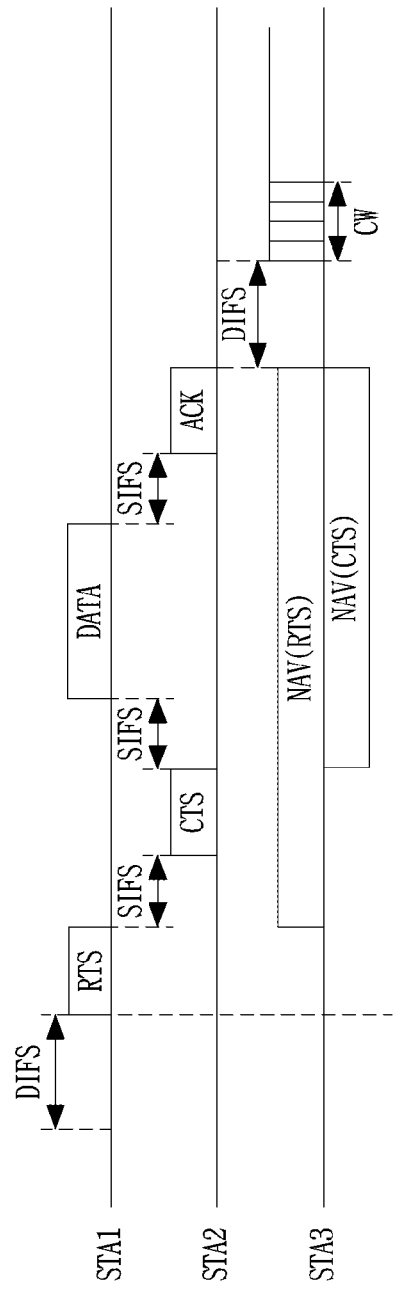
FIG. 5 is a conceptual diagram illustrating a procedure for transmitting a frame in Carrier Sense Multiple Access with Collision Avoidance (CSMA/CA) for avoiding collisions between frames in a channel.

FIG. 5 is a conceptual diagram illustrating a CSMA/CA-based frame transmission procedure for avoiding collisions between frames in a channel.

Referring FIG. 5, a first STA (STA1) is a transmit WLAN device for transmitting data, a second STA (STA2) is a receive WLAN device for receiving the data from STA1, and a third STA (STA3) is a WLAN device which may be located in an area where a frame transmitted from STA1 and/or a frame transmitted from STA2 can be received by STA3.

STA1 may determine whether the channel is busy by carrier sensing. The STA1 may determine the channel occupation based on an energy level on the channel or correlation of signals in the channel, or may determine the channel occupation by using a Network Allocation Vector (NAV) timer.

After determining that the channel is not being used by other devices during DIFS (that is, the channel is idle), STA1 may transmit an RTS frame to STA2 after performing backoff Upon receiving the RTS frame, STA2 may transmit a CTS frame as a response to the CTS frame after SIFS.

When STA3 receives the RTS frame, STA3 may set the NAV timer for a transmission duration of subsequently transmitted frame by using duration information included in the RTS frame. For example, the NAV timer may be set for a duration of SIFS+CTS frame duration+SIFS+data frame duration+SIFS+ACK frame duration. When STA3 receives the CTS frame, it may set the NAV timer for a transmission duration of subsequently transmitted frames by using duration information included in the CTS frame. For example, the NAV timer may be set for a duration of SIFS+a data frame duration+SIFS+an ACK frame duration. Upon receiving a new frame before the NAV timer expires, STA3 may update the NAV timer by using duration information included in the new frame. STA3 does not attempt to access the channel until the NAV timer expires.

When STA1 receives the CTS frame from STA2, it may transmit a data frame to STA2 after SIFS elapsed from the CTS frame has been completely received. Upon successfully receiving the data frame, STA2 may transmit an ACK frame as a response to the data frame after SIFS elapsed.

When the NAV timer expires, STA3 may determine whether the channel is busy through the use of carrier sensing. Upon determining that the channel is not in use by other devices during DIFS and after the NAV timer has expired, STA3 may attempt channel access after a contention window after a random backoff has elapsed.

Figure 6:
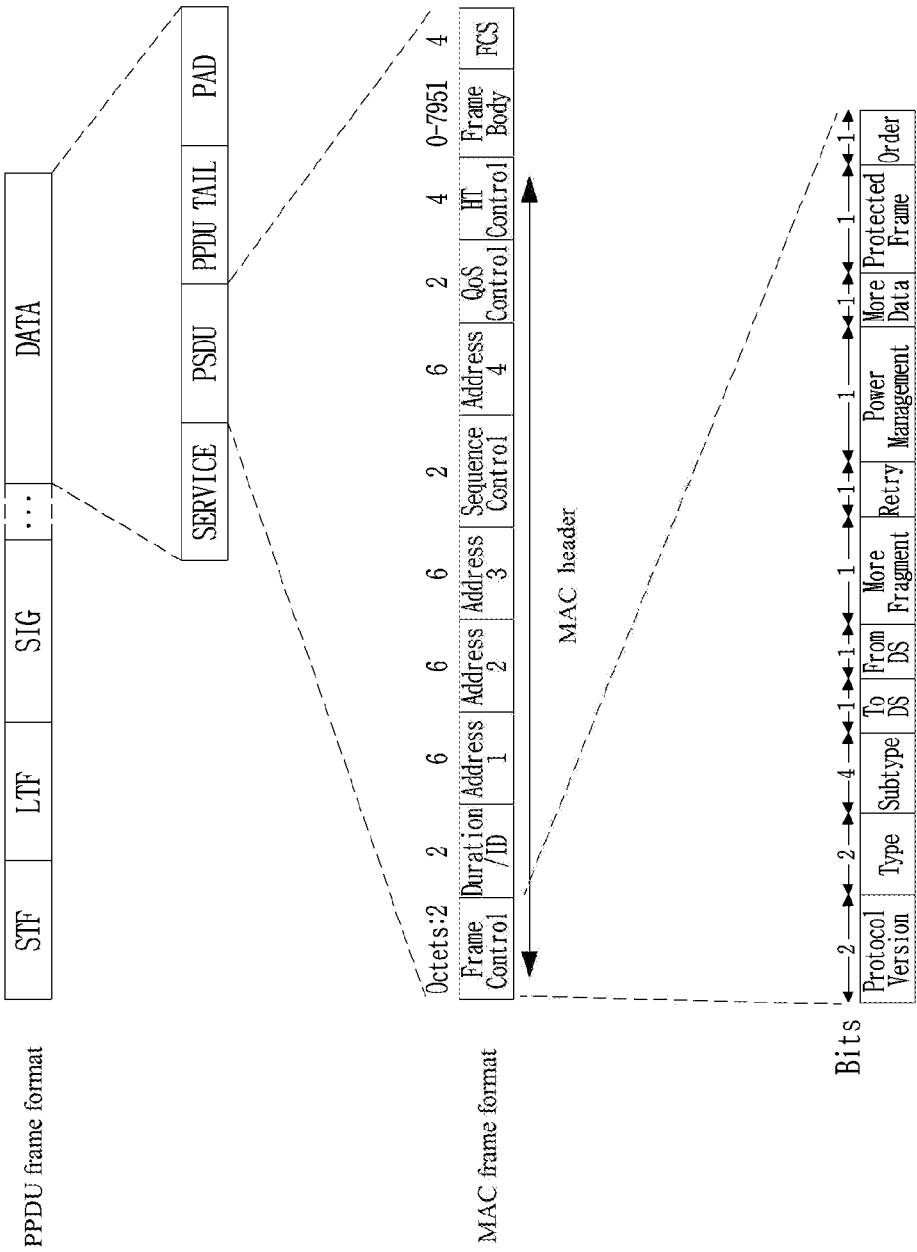
FIG. 6 depicts an exemplary frame structure in a WLAN system.

FIG. 6 depicts an exemplary frame structure in a WLAN system.

PHY layer may prepare a transmission MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of a PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. A part of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification.

The Frame Control field of the MAC header may include Protocol Version, Type, Subtype, To DS, From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes only a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present disclosure defines a new PPDU frame format for the IEEE 802.11 ax HEW system. The new PPDU frame format may support MU-MIMO or OFDMA. A PPDU of the new format may be referred to as a 'HEW PPDU' or 'HE PPDU' (similarly, HEW xyz may be referred to as 'HE xyz' or 'HE-xyz' in the following descriptions).

In present specification, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
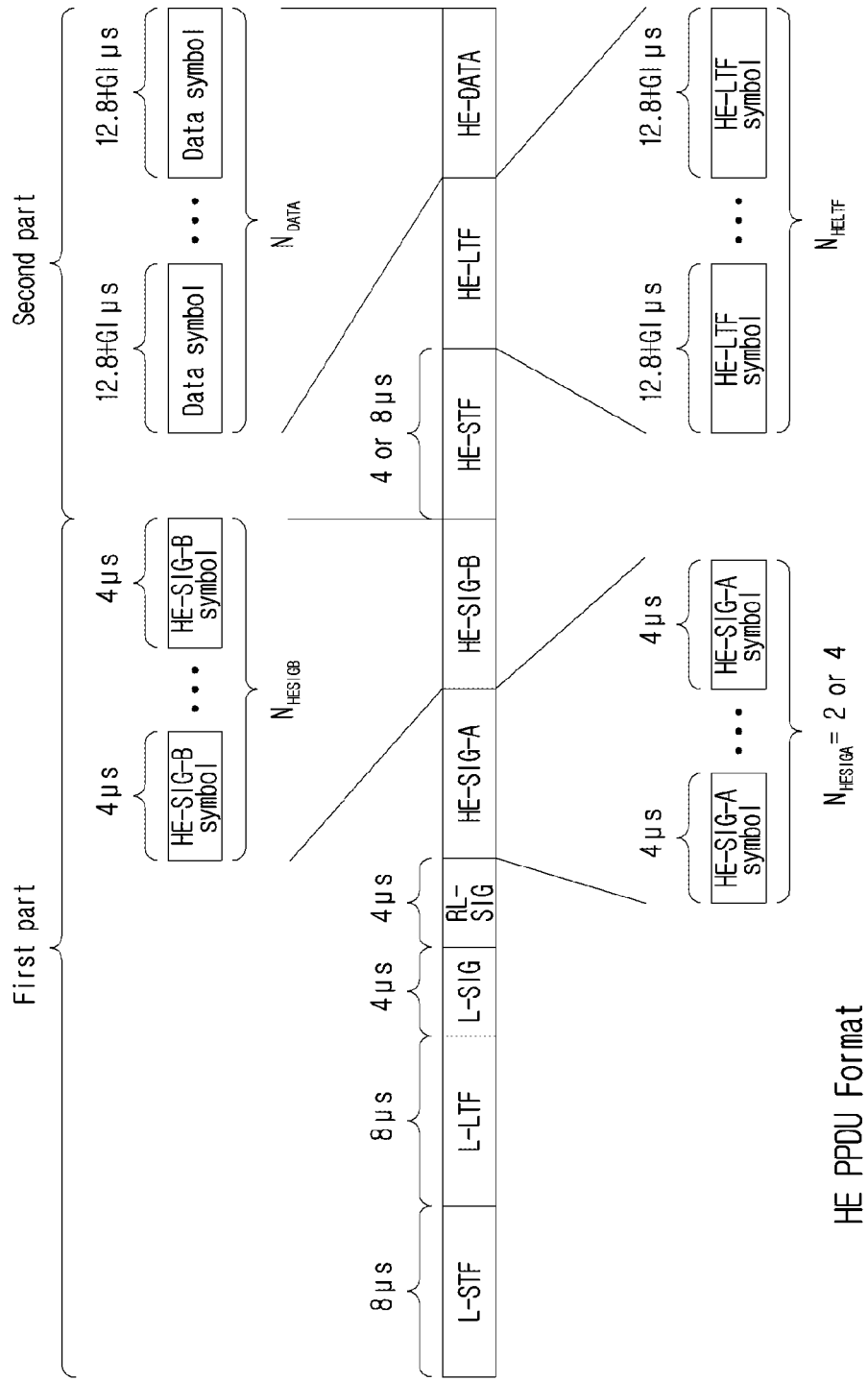
FIG. 7 depicts an exemplary HE PPDU frame format.

FIG. 7 depicts an exemplary HE PPDU frame format.

A transmitting STA may generate a PPDU frame according to the HE PPDU frame format as illustrated in FIG. 7 and transmit the PPDU frame to a receiving STA. The receiving STA may detect a PPDU and then process the PPDU.

The HE PPDU frame format may broadly include two parts: the first part including an L-STF field, an L-LTF field, an L-SIG field, an RL-SIG field, a HE-SIG-A field, and a HE-SIG-B field and the second part including a HE-STF field, a HE-LTF field, and a HE-DATA field. 64-FFT based on a channel bandwidth of 20 MHz may be applied to the first part and a basic subcarrier spacing of 312.5 kHz and a basic DFT period of 3.2 µs may be included in the first part. 256-FFT based on a channel bandwidth of 20 MHz may be applied to the second part and a basic subcarrier spacing of 75.125 kHz and a basic DFT period of 12.8 µs may be included in the second part.

The HE-SIG-A field may include $N_{HESIGA}$ symbols, the HE-SIG-B field may include $N_{HESIGB}$ symbols, the HE-LTF field may include $N_{HELTF}$ symbols, and the HE-DATA field may include $N_{DATA}$ symbols.

A detailed description of the fields included in the HE PPDU frame format is given in Table 1.

TABLE 1

| Element | definition | duration | DFT period | GI | Subcarrier spacing | Description |
|---|---|---|---|---|---|---|
| Legacy(L)-STF | Non-high throughput(HT) Short Training field | 8 µs | — | — | equivalent to 1,250 kHz | L-STF of a non-trigger-based PPDU has a periodicity of 0.8 µs with 10 periods. |
| L-LTF | Non-HT Long Training field | 8 µs | 3.2 µs | 1.6 µs | 312.5 kHz | |
| L-SIG | Non-HT SIGNAL field | 4 µs | 3.2 µs | 0.8 µs | 312.5 kHz | |
| RL-SIG | Repeated Non-HT SIGNAL field | 4 µs | 3.2 µs | 0.8 µs | 312.5 kHz | |
| HE-SIG-A | HE SIGNAL A field | $N_{HESIGA}$ * 4 µs | 3.2 µs | 0.8 µs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |

TABLE 1-continued

| Element | definition | duration | DFT period | GI | Subcarrier spacing | Description |
|---|---|---|---|---|---|---|
| HE-SIG-B | HE SIGNAL B field | $N_{HESIGB}$ * 4 μs | 3.2 μs | 0.8 μs | 312.5 kHz | $N_{HESIGB}$ means the number of OFDM symbols of the HE-SIG-B field and is variable. DL MU packet contains HE-SIG-B. SU packets and UL Trigger based packets do not contain HE-SIG-B. |
| HE-STF | HE Short Training field | 4 or 8 μs | — | — | non-trigger-based PPDU: (equivalent to) 1,250 kHz; trigger-based PPDU: (equivalent to) 625 kHz | HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μS with 5 periods. A trigger-based PPDU is an UL PPDU sent in response to a trigger frame. |
| HE-LTF | HE Long Training field | $N_{HELTF}$ * (DTF period + GI) μs | 2xLTF: 6.4 μs 4xLTF: 12.8 μs | supports 0.8, 1.6, 3.2 μs | 2xLTF: (equivalent to) 156.25 kHz; 4xLTF: 78.125 kHz | HE PPDU shall support 2xLTF mode and 4xLTF mode. In the 2xLTF mode, HE-LTF symbol excluding GI is equivalent to modulating every other tone in an OFDM symbol of 12.8 μs excluding GI, and then removing the second half of the OFDM symbol in time domain. $N_{HELTF}$ means the number of HE-LTF symbols and is equal to 1, 2, 4, 6, 8. |
| HE-DATA | HE DATA field | $N_{DATA}$ * (DIE period + GI) μs | 12.8 μs | supports 0.8, 1.6, 3.2 μs | 78.125 kHz | $N_{DATA}$ means the number of HE data symbols. |

L-STF is a non-HT Short Training field and may have a duration of 8 μs and a subcarrier spacing equivalent to 1250 kHz. L-STF of a PPDU which is not based on a trigger may have a periodicity of 0.8 μs with 10 periods. Herein, the trigger corresponds to scheduling information for UL transmission.

L-LTF is a non-HT Long Training field and may have a duration of 8 μs, a DFT period of 3.2 μs, a Guard Interval (GI) of 1.6 μs, and a subcarrier spacing of 312.5 kHz.

L-SIG is a non-HT SIGNAL field and may have a duration of 4 μs, a DFT period of 3.2 μs, a GI of 0.8 μs, and a subcarrier spacing of 312.5 kHz.

RL-SIG is a Repeated Non-HT SIGNAL field and may have a duration of 4 μs, a DFT period of 3.2 acs, a GI of 0.8 μs, and a subcarrier spacing of 312.5 kHz.

L-STF, L-LTF, L-SIG, and RL-SIG may be called legacy preambles.

HE-SIG-A is a HE SIGNAL A field and may have a duration of $N_{HESIGA}$*4 μs, a DFT period of 3.2 μs, a GI of 0.8 μs, and a subcarrier spacing of 312.5 kHz. HE-SIG-A may be duplicated on each 20 MHz segment after the legacy preambles to indicate common control information. $N_{HESIGA}$ represents the number of OFDM symbols of the HE-SIG-A field and may have a value of 2 or 4.

HE-SIG-B is a HE SIGNAL B field and may have a duration of $N_{HESIGB}$*4 μs, a DFT period of 3.2 acs, a GI of 0.8 μs, and a subcarrier spacing of 312.5 kHz. $N_{HESIGB}$ represents the number of OFDM symbols of the HE-SIG-B field and may have a variable value. In addition, although a DL Multi-User (MU) packet may include the HE-SIG-B field, a Single-User (SU) packet and a UL trigger based packet may not include the HE-SIG-B field.

HE-STF is a HE Short Training field and may have a duration of 4 or 8 μs. A non-trigger based PPDU may have a subcarrier spacing equivalent to 1250 kHz and a trigger based PPDU may have a subcarrier spacing equivalent to 625 kHz. HE-STF of the non-triggered PPDU may have a periodicity of 0.8 μs with 4 periods. The non-triggered PPDU is not transmitted in response to a trigger field. HE-STF of the trigger based PPDU may have a periodicity of 1.6 μs with 5 periods. The trigger based PPDU is a UL PPDU transmitted in response to the trigger frame.

HE-LTF is a HE Long Training field and may have a duration of $N_{HELTF}$*(DFT period+GI) μs. $N_{HELTF}$ represents the number of HE-LTF symbols and may have a value of 1, 2, 4, 6, or 8. A HE PPDU may support a 2xLTF mode and a 4xLTF mode. In the 2xLTF mode, a HE-LTF symbol except for a GI is equivalent to a symbol obtained by modulating every other tone in an OFDM symbol of 12.8 μs excluding a GI and then eliminating the first half or the second half of the OFDM symbol in the time domain. In the 4xLTF mode, a HE-LTF symbol excluding a GI are equivalent to a symbol obtained by modulating every fourth tone in an OFDM symbol of 12.8 μs excluding a GI and then eliminating the first three-fourths or the last three-fourths of the OFDM symbol in the time domain. 2xLTF may have a DFT period of 6.4 μs and 4xLTF may have a DFT period of 12.8 μs. A GI of HE-LTF may support 0.8 μs, 1.6 μs, and 3.2 μs. 2xLTF may have a subcarrier spacing equivalent to 156.25 kHz and 4xLTF may have a subcarrier spacing of 78.125 kHz.

HE-DATA is a HE DATA field and may have a duration of, $N_{DATA}$*(DFT period+GI) μs. $N_{DATA}$ represents the number of HE-DATA symbols. HE-DATA may have a DFT period of 12.8 μs. A GI of HE-DATA may support 0.8 μs, 1.6 μs, and 3.2 μs. HE-DATA may have a subcarrier spacing of 78.125 kHz.

The above description of the fields included in the HE PPDU frame format may be combined with exemplary HE PPDU frame formats described below. For example, characteristics of fields exemplarily described below may be applied while a transmission order of the fields of the HE PPDU frame format of FIG. 7 is maintained.

Figure 8:
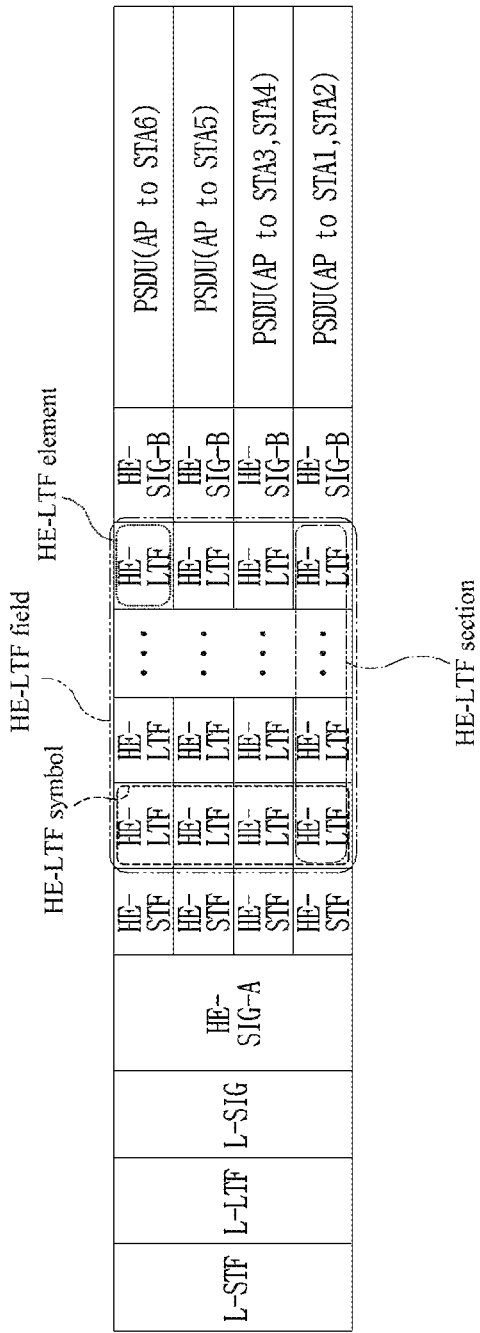
FIG. 8 depicts an exemplary High Efficiency (HE) Physical layer Protocol Data Unit (PPDU) frame format according to the present disclosure.

FIG. 8 depicts an exemplary HE PPDU frame format according to the present disclosure.

Referring to FIG. 8, the vertical axis represents frequency and the horizontal axis represents time. It is assumed that frequency and time increase in the upward direction and the right direction, respectively.

In the example of FIG. 8, one channel includes four subchannels. An L-STF, an L-LTF, an L-SIG, and an HE-SIG-A may be transmitted per channel (e.g., 20 MHz), a HE-STF and a HE-LTF may be transmitted on each subchannel being a basic subchannel unit (e.g., 5 MHz), and a HE-SIG-B and a PSDU may be transmitted on each of subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 8, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may be referred to as Resource Unit (RU) or subband. In particular, the terms like OFDMA subchannel, OFDMA RU, OFDMA subband can be used in embodiments for OFDMA in the present disclosure. Terms like a bandwidth of a subchannel, a number of tones (or subcarriers) allocated to a subchannel, a number of data tones (or data subcarriers) allocated to a subchannel can be used to express a size of a subchannel. A subchannel refers to a frequency band allocated to a STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 8, a plurality of HE-LTF elements are distinguished in the time and frequency domains. One HE-LTF element may correspond to one OFDM symbol in time domain and one subchannel unit (i.e., a subchannel bandwidth allocated to a STA) in frequency domain. The HE-LTF elements are logical units, and the PHY layer does not necessarily operate in units of an HE-LTF element. In the following description, a HE-LTF element may be referred to shortly as a HE-LTF.

A HE-LTF symbol may correspond to a set of HE-LTF elements in one OFDM symbol in time domain and in one channel unit (e.g., 20 MHz) in frequency domain.

A HE-LTF section may correspond to a set of HE-LTF elements in one or more OFDM symbols in time domain and in one subchannel unit (i.e., a subchannel bandwidth allocated to a STA) in frequency domain.

A HE-LTF field may be a set of HE-LTF elements, HE-LTF symbols, or HE-LTF sections for a plurality of stations.

The L-STF field is used for frequency offset estimation and phase offset estimation, for preamble decoding at a legacy STA (i.e., a STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., setting a NAV based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at a HE STA (or HEW STA). The parameters set included in the HEW SIG-A field may include one or more of Very High Throughput (VHT) PPDU modulation parameters transmitted by IEEE 802.11ac stations, as listed in [Table 2] below, to ensure backward compatibility with legacy STAs (e.g., IEEE 802.11ac stations).

TABLE 2

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 MHz, and 3 for 160 MHz and 80 + 80 MHz |
| | B2 | Reserved | 1 | Reserved. Set to 1. |
| | B3 | STBC | 1 | For a VHT SU PPDU: Set to 1 if space time block coding is used and set to 0 otherwise. For a VHT MU PPDU: Set to 0. |
| | B4-B9 | Group ID | 6 | Set to the value of the TXVECTOR parameter GROUP_ID. A value of 0 or 63 indicates a VHT SU PPDU; otherwise, indicates a VHT MU PPDU. |
| | B10-B21 | NSTS/Partial AID | 12 | For a VHT MU PPDU: NSTS is divided into 4 user positions of 3 bits each. User position p, where $0 \leq p \leq 3$, uses bits B(10 + 3p) to B(12 + 3p). The number of space-time streams for user u are indicated at user position p = USER_POSITION[u] where u = 0, 1, . . . , NUM_USERS − 1 and the notation A[b] denotes the value of array A at index b. Zero space-time streams are indicated at positions not listed in the USER_POSITION array. Each user position is set as follows: Set to 0 for 0 space-time streams Set to 1 for 1 space-time stream |

TABLE 2-continued

| Two parts of VHT-SIG-A | Bit | Field | Number of bits | Description |
|---|---|---|---|---|
| | | | | Set to 2 for 2 space-time streams |
| | | | | Set to 3 for 3 space-time streams |
| | | | | Set to 4 for 4 space-time streams |
| | | | | Values 5-7 are reserved |
| | | | | For a VHT SU PPDU: |
| | | | | B10-B12 |
| | | | | Set to 0 for 1 space-time stream |
| | | | | Set to 1 for 2 space-time streams |
| | | | | Set to 2 for 3 space-time streams |
| | | | | Set to 3 for 4 space-time streams |
| | | | | Set to 4 for 5 space-time streams |
| | | | | Set to 5 for 6 space-time streams |
| | | | | Set to 6 for 7 space-time streams |
| | | | | Set to 7 for 8 space-time streams |
| | | | | B13-B21 |
| | | | | Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise. The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |
| | B3 | LDPC Extra OFDM Symbol | 1 | Set to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU: VHT-MCS index For a VHT MU PPDU: If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1. If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1. If the MU[3] NSTS field is nonzero, then B6 indicates coding for user u with USER_POSITION[u] = 3: set to 0 for BCC, 1 for LDPC. If the MU[3] NSTS field is 0, then B6 is reserved and set to 1. B7 is reserved and set to 1 |
| | B8 | Beamformed | 1 | For a VHT SU PPDU: Set to 1 if a Beamforming steering matrix is applied to the waveform in an SU transmission as described in 20.3.11.11.2, set to 0 otherwise. For a VHT MU PPDU: Reserved and set to 1 NOTE-If equal to 1 smoothing is not recommended. |
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0-23 of VHT-SIG-A1 and bits 0-9 of VHT-SIG-A2, respectively. |
| | B18-B23 | Tail | 6 | Used to terminate the trellis of the convolutional decoder. Set to 0. |

[Table 2] illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11ac-2013 technical specification. In the HE PPDU frame format of the present disclosure, the HE-SIG-A field may include one or more of the fields included in the VHT-SIG-A field, and it may provide backward compatibility with IEEE 802.11ac stations.

Figure 9:
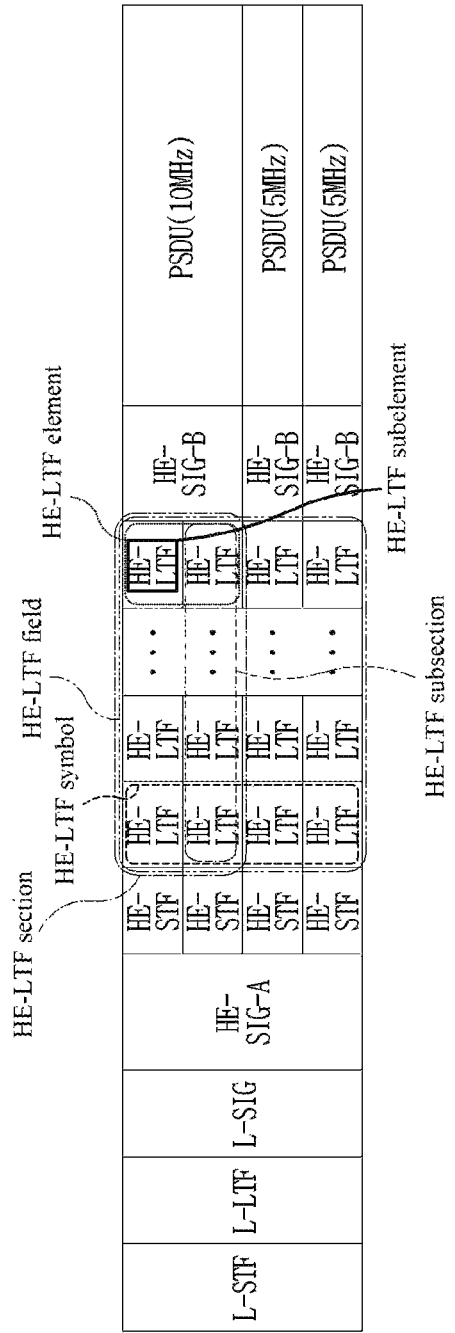
FIG. 9 depicts subchannel allocation in a HE PPDU frame format according to the present disclosure.

FIG. 9 depicts subchannel allocation in the HE PPDU frame format according to the present disclosure.

In FIG. 9, it is assumed that information indicating subchannels allocated to STAs in HE PPDU indicates that 0 MHz subchannel is allocated to STA1 (i.e., no subchannel is allocated), a 5-MHz subchannel is allocated to each of STA2 and STA3, and a 10-MHz subchannel is allocated to STA4.

In the example of FIG. 9, an L-STF, an L-LTF, an L-SIG, and a HE-SIG-A may be transmitted per channel (e.g., 20 MHz), a HE-STF and a HE-LTF may be transmitted on each of subchannels being basic subchannel units (e.g., 5 MHz), and a HE-SIG-B and a PSDU may be transmitted on each of subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 9, the size of a subchannel allocated to STA2 is equal to that of the basic subchannel unit, the size of a subchannel allocated to STA3 is equal to that of the basic subchannel unit, and the size of a subchannel allocated to STA4 is twice larger than that of the basic subchannel unit.

FIG. 9 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF subelement may correspond to one OFDM symbol in the time domain and one basic subchannel unit (e.g. 5 MHz) in the frequency domain. In the example of FIG. 9, one HE-LTF element includes one HE-LTF subelement in the 5-MHz subchannel allocated to STA2 or STA3. On the other hand, one HE-LTF element includes two HE-LTF subelements in the third subchannel, i.e., 10-MHz subchannel, allocated to STA4. A HE-LTF element and a HE-LTF subelement are logical units and the PHY layer does not always operate in units of a HE-LTF element or HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

A HE-LTF section may correspond to a set of HE-LTF elements in one or more OFDM symbols in the time domain and one subchannel unit (i.e. the bandwidth of a subchannel allocated to a STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 9, one HE-LTF section includes one HE-LTF subsection in the 5-MHz subchannel allocated to STA2 or STA3. On the other hand, one HE-LTF section includes two HE-LTF subsections in the third subchannel, i.e., 10-MHz subchannel, allocated to STA4.

A HE-LTF field may correspond to a set of HE-LTF elements (or subelements), HE-LTF symbols, or HE-LTF sections (or subsections) for a plurality of stations.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 8, if one channel includes four subchannels, it may not be allowed to keep the third subchannel unallocated and empty, while the first, second, and fourth subchannels are allocated to STAs. However, the present disclosure does not exclude non-allocation of an intermediate subchannel of one channel to a STA.

Figure 10:
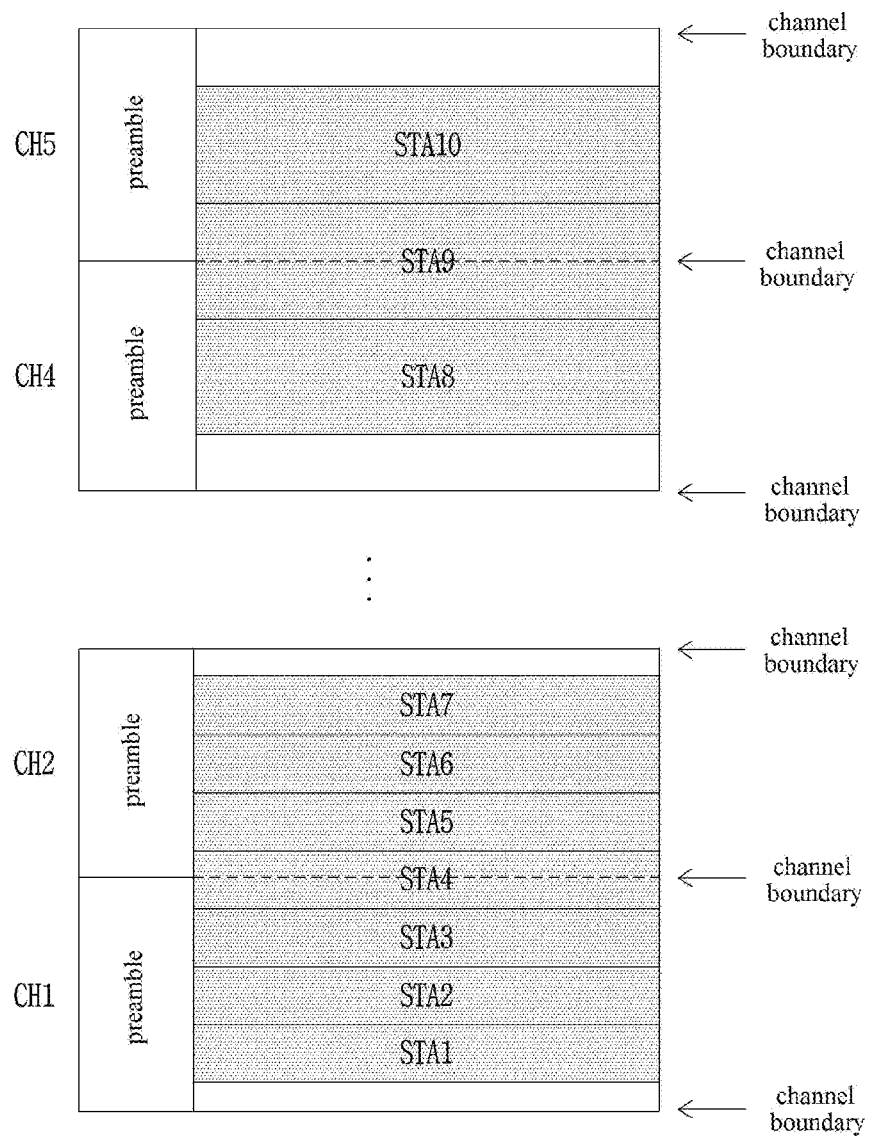
FIG. 10 depicts a subchannel allocation method according to the present disclosure.

FIG. 10 depicts a subchannel allocation method according to the present disclosure.

In the example of FIG. 10, a plurality of contiguous channels (e.g., 20-MHz-bandwidth channels) and boundaries of the plurality of contiguous channels are shown. In FIG. 10, a preamble may correspond to an L-STF, an L-LTF, an L-SIG, and a HE-SIG-A as illustrated in the examples of FIGS. 8 and 9.

A subchannel for each HE STA may be allocated only within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 10 is based on the assumption that subchannels each having the size of a basic subchannel unit (e.g., 5 MHz) in CH1 and CH2 are allocated to STA1 to STA7, and subchannels each having double the size (e.g., 10 MHz) of the basic subchannel unit in CH4 and CH5 are allocated to STA8, STA9, and STA10.

As illustrated in the lower part of FIG. 9, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to the two channels). In the forgoing example of the present disclosure, the subchannel allocation to STA4 is not allowed.

As illustrated in the higher part of FIG. 9, although a subchannel allocated to STA8 or STA10 is fully overlapped only with one channel (i.e., crossing the channel boundary, or belonging only to one channel), a subchannel allocated to STA9 is partially overlapped with two channels (i.e., crossing the channel boundary, or belonging to the two channels).

In the forgoing example of the present disclosure, the subchannel allocation to STA9 is not allowed.

On the other hand, it may be allowed to allocate a subchannel partially overlapped between a plurality of channels (i.e., crossing the channel boundary, or belonging to two channels). For example, in SU-MIMO mode transmission, a plurality of contiguous channels may be allocated to a STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present disclosure and thus should not be construed as limiting the present disclosure. For example, the bandwidths of a channel and a subchannel may be defined or allocated as values other than the above examples. In addition, a plurality of subchannels in one channel may have the same or different channel widths.

FIG. 11 depicts the starting and ending points of a HE-LTF field in the HE PPDU frame format according to the present disclosure.

To support the MU-MIMO mode and the OFDMA mode, the HE PPDU frame format according to the present disclosure may include, in the HE-SIG-A field, information about the number of spatial streams to be transmitted to a HE STA allocated to each subchannel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in detail.

FIG. 11 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are required to support MU-MIMO transmission.

According to an example of the present disclosure, relationship between a total number of spatial streams transmitted on one subchannel and a number of HE-LTFs is listed in [Table 3].

TABLE 3

| Total number of spatial streams transmitted on one subchannel | Number of HE-LTFs |
| --- | --- |
| 1 | 1 |
| 2 | 2 |
| 3 | 4 |
| 4 | 4 |
| 5 | 6 |
| 6 | 6 |
| 7 | 8 |
| 8 | 8 |

Referring to [Table 3], if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number of adding 1 to the number of the spatial streams need to be transmitted.

Referring to FIG. 11 again, it is assumed that the second 5-MHz subchannel is allocated to STA3 and STA4 and one spatial streams per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 11, a HE-STF, a HE-LTF, a HE-LTF, a HE-LTF, a HE-LTF, and a HE-SIG-B follow the HE-SIG-A field on the subchannel (i.e., four HE-LTFs are transmitted). This is for setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby no orthogonality is maintained. To overcome this problem, an additional constraint need to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the numbers of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the numbers of HE-LTFs (HE-LTF symbols or HE-LTF elements in a HE-LTF section) required according to the total numbers of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 8) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to [Table 3]). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for a STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (P is an integer equal to or larger than 1) HE-LTF symbols (refer to FIG. 8) and transmit a HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e. P) of another subchannel. Also, the number of HE-LTF elements (i.e., P) included in a HE-LTF section in one of the Q subchannels may be equal to the number of HE-LTF elements (i.e. P) included in a HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or stations).

Referring to FIG. 11 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 11, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are actually not used for channel estimation at the STAs.

FIG. 12 depicts a HE-SIG-B field and a HE-SIG-C field in the HE PPDU frame format according to the present disclosure.

To effectively support MU-MIMO-mode or OFDMA-mode transmission in the HE PPDU frame format according to the present disclosure, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, a HE-SIG-A field. A HE-SIG-B field may include spatial stream allocation information about one subchannel. Also, a HE-SIG-C field may be transmitted after transmission of HE-LTFs, including Modulation and Coding Scheme (MCS) information about a PSDU and information about the length of the PSDU, etc.

With reference to the foregoing examples of the present disclosure, mainly the features of a HE PPDU frame structure applicable to a DL MU-MIMO-mode or OFDMA-mode transmission that an AP transmits simultaneously to a plurality of STAs have been described. Now, a description will be given of the features of a HE PPDU frame structure applicable to a UL MU-MIMO-mode or OFDMA-mode transmission that a plurality of STAs transmits simultaneously to an AP.

The above-described various examples of structures of the HE PPDU frame format supporting MU-MIMO-mode or OFDMA-mode transmission should not be understood as applicable only to DL without applicable UL. Rather, the examples should be understood as also applicable to UL. For example, the above-described exemplary HE PPDU frame formats may also be used for a UL HE PPDU transmission that a plurality of STAs simultaneously transmits to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to a HE STA allocated to each of a plurality of subchannels. Therefore, the AP may include, in a HE-SIG-A field or a HE-SIG-B field, information about the total number of spatial streams transmitted across a channel, a maximum number of spatial streams (i.e., information being a basis of the number of HE-LTF elements (or the starting point and ending point of a HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmits to an AP, each STA being a transmission entity may be aware only of the number of spatial streams in a HE PSDU that it will transmit, without knowledge of the number of spatial streams in a HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, a HE PPDU frame format applicable to a UL MU-MIMO or OFDMA mode may be configured without a modification to an exemplary HE PPDU frame format applied to a DL MU-MIMO or OFDMA mode. For example, each STA may configure a HE PPDU frame format by including information about the number of spatial streams across a channel in a HE-SIG-A field, determining the number of HE-LTF elements (or the starting point and ending point of a HE-LTE section) on each subchannel according to the maximum number of spatial streams, and including information about the number of spatial streams for the individual STA in a HE-SIG-B field.

Alternatively, if the STAs operate always according to the common/individual parameters received in the trigger frame from the AP, each STA does not need to indicate the common/individual parameters to the AP during a HE PPDU transmission. Therefore, this information may not be included in a HE PPDU. For example, each STA may have only to determine the total number of spatial streams, the maximum number of spatial streams, and the number of spatial streams allocated to individual STA, as indicated by the AP, and configure a HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel Bandwidth (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before a HE-LTF field because the number of spatial streams and the information indicating whether STBC is used or not are significant to determination of configuration information about a preamble and a PSDU in a HE PPDU frame format (e.g., the number of HE-LTF elements is determined according to a combination of the number of spatial streams and the information indicating whether STBC is used or not). For this purpose, a HE PPDU frame format as illustrated in FIG. 13 may be used for a UL HE PPDU transmission.

FIG. 13 depicts another exemplary HE PPDU frame format according to the present disclosure. The HE PPDU frame format illustrated in FIG. 13 is characterized in that a structure of HE-SIG-A, HE-SIG-B, and HE-SIG-C fields similar to in FIG. 12 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of a HE-SIG-B field, a HE-SIG-C field, and a first HE-LTF element (i.e., a HE-LTF between a HE-STF field and a HE-SIG-B field) illustrated in FIG. 13 may not exist. In this case, a description of each field given below may be applied only in the presence of the field.

In the example of FIG. 13, a HE-SIG-A field is transmitted per channel (i.e., per 20-MHz channel) and may include transmission parameters common to simultaneously transmitted HE PSDUs. Since the same information is transmitted in up to HE-SIG-A fields in UL PPDUs transmitted by HE STAs allocated to subchannels, the AP may receive the same signals from the plurality of STAs successfully.

A HE-SIG-B field is transmitted per subchannel in one channel. The HE-SIG-B field may have an independent parameter value according to the transmission characteristics of a HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

A HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similarly to DL MU-MIMO-mode or OFDMA-mode HE PPDU transmission, transmissions of PSDUs may start at different time points on subchannels in UL MU-MIMO-mode or OFDMA-mode HE PPDU transmission, and if OFDM symbols are not aligned accordingly, then the implementation complexity of an AP that receives a plurality of PSDUs increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 11.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

As described before, a plurality of STAs may simultaneously transmit PSDUs in a HE PPDU frame format on their allocated subchannels or on their allocated spatial streams to an AP (i.e., referred to as UL MU-MIMO or OFDMA transmission or "UL MU transmission") and may simultaneously receive PSDUs in the HE PPDU frame format on their allocated subchannels on their allocated spatial streams from the AP (i.e., referred to as DL MU-MIMO or OFDMA transmission or "DL MU transmission").

Figure 14:
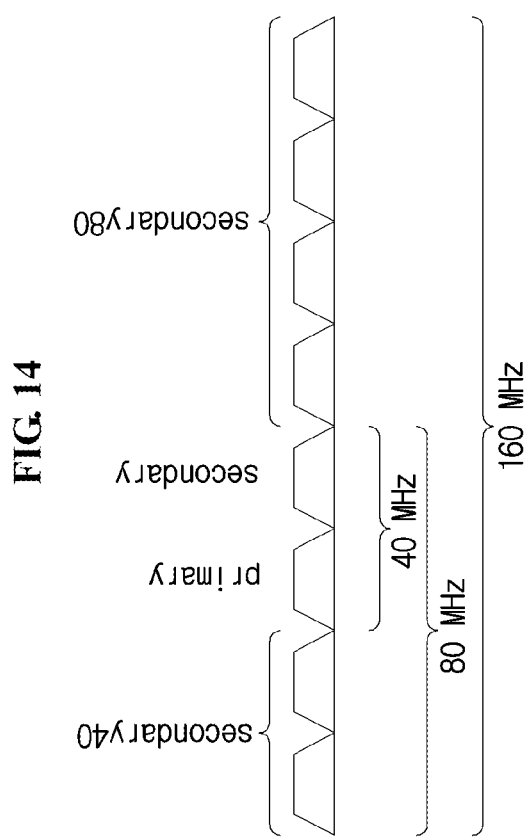
FIGS. 14 and 15 depict operating channels in a WLAN system.
Figure 15:
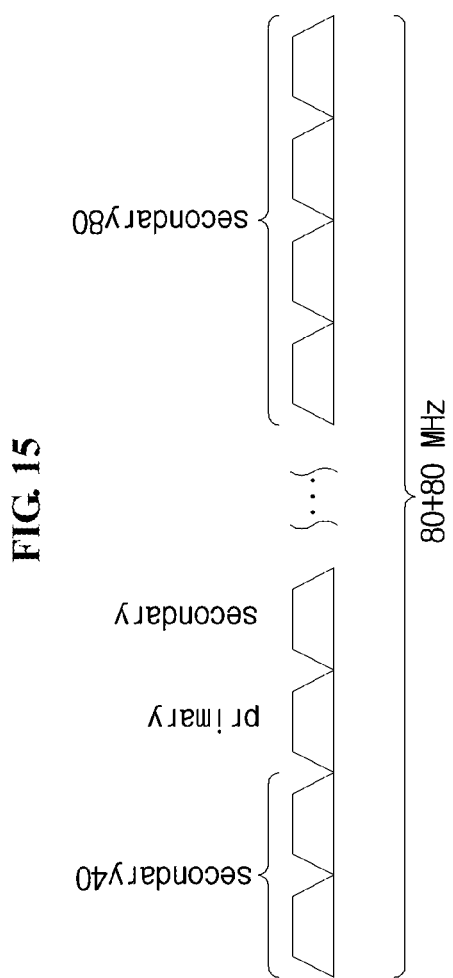

FIGS. 14 and 15 depict operating channels in a WLAN system.

Basically, the WLAN system may support a single channel having a bandwidth of 20 MHz as a BSS operating channel. The WLAN system may also support a BSS operating channel having a bandwidth of 40 MHz, 80 MHz, or 160 MHz by bonding a plurality of contiguous 20-MHz channels (refer to FIG. 14). Further, the WLAN system may support a BSS operating channel having a bandwidth of 160 MHz including non-contiguous 80-MHz channels (called a bandwidth of 80+80 MHz) (refer to FIG. 15).

As illustrated in FIG. 14, one 40-MHz channel may include a primary 20-MHz channel and a secondary 20-MHz channel which are contiguous. One 80-MHz channel may include a primary 40-MHz channel and a secondary 40-MHz channel which are contiguous. One 160-MHz channel may include a primary 80-MHz channel and a secondary 80-MHz channel which are contiguous. As illustrated in FIG. 15, one 80+80-MHz channel may include a primary 80-MHz channel and a secondary 80-MHz channel which are non-contiguous.

A primary channel is defined as a common channel for all STAs within a BSS. The primary channel may be used for transmission of a basic signal such as a beacon. The primary channel may also be a basic channel used for transmission of a data unit (e.g., a PPDU). If an STA uses a channel width larger than the channel width of the primary channel, for data transmission, the STA may use another channel within a corresponding channel, in addition to the primary channel. This additional channel is referred to as a secondary channel.

An STA, which operates according to a contention-based channel access scheme (e.g., Enhanced Distributed Channel Access (EDCA)), may determine a transmission bandwidth (or a transmission channel width) in the following manner.

Upon generation of a transmission frame, an STA (e.g., an AP or a non-AP STA) may perform a back-off procedure on a primary channel in order to acquire a Transmission Opportunity (TXOP). For this purpose, the STA may sense the primary channel during a DIFS or AIFS[i]. If the primary channel is idle, the STA may attempt to transmit the frame. The STA may select a random back-off count, wait for a slot time corresponding to the selected random back-off count, and then attempt to transmit the frame. The random back-off count may be determined to be a value ranging from 0 to CW (CW is a value of a contention window parameter).

When the random back-off procedure starts, the STA may activate a back-off timer according to the determined back-off count and decrement the back-off count by 1 each time. If the medium of the corresponding channel is monitored as busy, the STA discontinues the count-down and waits. If the medium is idle, the STA resumes the count-down. If the back-off timer reaches 0, the STA may determine a transmission bandwidth by checking whether the secondary channel is idle or busy at the corresponding time point.

For example, the STA may monitor a channel-idle state during a predetermined IFS (e.g., DIFS or AIFS[i]) on the primary channel and determine a transmission start timing on the primary channel by the random back-off procedure. If the secondary channel is idle during a PIFS shortly before the determined transmission start timing of the primary channel, the STA may transmit a frame on the primary channel and the secondary channel.

As described above, when the back-off timer reaches 0 for the primary channel, the STA may transmit an X-MHz mask PPDU (e.g., X is 20, 40, 80, or 160) on channels including an idle secondary channel(s) according to the CCA result of the secondary channel(s).

The X-MHz mask PPDU is a PPDU for which a TXVECTOR parameter, CH_BANDWIDTH is set to CBW X. That is, if the X-MHz mask PPDU can be transmitted, this means that a PPDU satisfying a spectrum mask for X-MHz transmission can be transmitted. The X-MHz mask PPDU may include a PPDU transmitted in a bandwidth equal to or smaller than X MHz.

For example, if an 80-MHz mask PPDU can be transmitted, this means that a PPDU having a channel width of 80 MHz or a PPDU having a channel width smaller than 80 MHz (e.g., 40 MHz, 20 MHz, etc.) can be transmitted within a Power Spectral Density (PSD) limit of a spectrum mask for 80-MHz transmission.

As described before, if a STA is allowed to start a TXOP and has at least one MAC Service Data Unit (MSDU) to be transmitted under the Access Category (AC) of the TXOP allowed for the STA, the STA may perform one of the following a), b), c), d), or e) (in the following description, FIGS. 14 and 15 may be referred to for a primary channel (i.e., a primary 20-MHz channel) a secondary channel (i.e., a secondary 20-MHz channel), a secondary 40-MHz channel, and a secondary 80-MHz channel).

a) If the secondary channel, the secondary 40-MHz channel, and the secondary 80-MHz channel are idle during a PIFS shortly before the start of the TXOP, a 160-MHz or 80+80-MHz mask PPDU may be transmitted.

b) If both the secondary channel and the secondary 40-MHz channel are idle during the PIFS shortly before the start of the TXOP, an 80-MHz mask PPDU may be transmitted on a primary 80-MHz channel.

c) If the secondary channel is idle during the PIFS shortly before the start of the TXOP, a 40-MHz mask PPDU may be transmitted on a primary 40-MHz channel.

d) A 20-MHz mask PPDU may be transmitted on the primary 20-MHz channel.

e) A channel access attempt may be resumed by performing a back-off procedure as in the case where the medium is indicated as busy on the primary channel by one of physical carrier sensing and virtual carrier sensing and a back-off timer has a value of 0.

In a WLAN system, an STA may determine whether a channel is available (e.g., by CCA, etc.) and, when the channel is available, the STA may transmit a frame, as described above. However, UL MU transmission from STAs to an AP is performed based on triggering by the AP (or the AP's polling for the UL MU transmission) in a HEW. For this purpose, the AP may provide information about a bandwidth for the UL MU transmission to the STAs. In this case, a bandwidth indicated by trigger information received from the AP may be different from an available bandwidth determined by an STA. Accordingly, there is a need for a method for determining a bandwidth for UL MU transmission in a HEW.

According to the present disclosure, if the AP indicates information about a bandwidth for UL MU transmission by a trigger, an STA may determine an available bandwidth for its UL transmission before performing UL MU transmission indicated by the trigger. For example, the STA may determine an available bandwidth based on virtual carrier sensing (e.g., NAV check), physical carrier sensing (e.g., CCA), and a bandwidth in which a trigger frame has been successfully received. Once the STA determines the available bandwidth, the STA may determine whether to perform UL transmission and a bandwidth for the UL transmission based on both the bandwidth indicated for the UL MU transmission by the trigger and the available bandwidth. In other words, according to the present disclosure, instead of autonomously determining a bandwidth for UL transmission, the STA may determine a bandwidth for the UL transmission based on information about a bandwidth for the UL transmission, provided by a UL receiver, the AP, and information about the available bandwidth of the STA.

FIGS. 16 to 19 depict determination of a channel width for UL MU transmission according to the present disclosure.

In the examples of FIGS. 16 to 19, UL MU-MIMO transmission is illustrated as UL MU transmission. However, the examples of the present disclosure are also be applicable in the same manner to UL OFDMA transmission in which one transmission channel is divided into a plurality of subchannels and each STA performs simultaneous UL transmission on a subchannel allocated to the STA.

In FIGS. 16 to 19, exemplary frame exchange sequences for UL MU transmission are illustrated. An AP may transmit a poll frame (i.e., a trigger frame) for UL MU-MIMO transmission to STAs to which the UL MU-MIMO transmission has been granted or requested. To request UL MU-MIMO transmission from STA1, STA2, STA3, and STA4, the AP may transmit a UL MU-MIMO Poll frame to STA1, STA2, STA3, and STA4. The UL MU-MIMO Poll frame directed to the plurality of STAs may include Receiver Address (i.e., an Address 1 field of a MAC header) set to a broadcast address, Transmitter Address (i.e., an Address 2 field of the MAC header) set to a MAC address of the AP, Basic Service Set Identifier (BSSID), and payload with IDs (e.g., Association Identifiers (AIDs)) of the STAs requested to perform the UL MU-MIMO transmission.

Further, since a UL MU PPDU is configured in a new format which is not defined in a legacy WLAN system (e.g., conforming to IEEE 802.11a/b/g/n/ac), an STA operating in the legacy WLAN system (i.e., a legacy STA) may not decode the UL MU PPDU. If the legacy STA fails to decode the UL MU PPDU, the legacy STA may transmit a frame, determining that a channel is not occupied during transmission of the UL MU PPDU. Therefore, to protect a UL MU PPDU from legacy STAs (i.e., legacy third-party STAs), the Duration field of the MAC header of a poll frame that triggers UL MU transmission may be set to a value that covers an allowed transmission time of the UL MU PPDU and a transmission time of a block ACK for the UL MU PPDU. Also, to enable the legacy STAs to decode the poll frame, check the value of the Duration field of the MAC header in the poll frame, and set a right NAV accordingly, the poll frame triggering the UL MU transmission may be configured in a NON-HT format (i.e., a basic or common format receivable by all legacy STAs).

Herein, the AP may not allocate a channel (or subchannel) for UL transmission in a channel other than a channel occupied by the poll frame. That is, at least one channel (or subchannel) allocated for the UL transmission may be included in the channel occupied by the poll frame transmitted by the AP.

For example, if the AP requests an STA to transmit a UL MU PPDU in 20 MHz or above (i.e., 20, 40, 80, 160, or 80+80 MHz), a poll frame triggering the UL MU transmission may be transmitted in the total bandwidth requested for transmission of the UL MU PPDU. To trigger transmission of a UL MU PPDU in a 40-MHz bandwidth as illustrated in the examples of FIGS. 16 to 19, a poll frame triggering the UL MU transmission may be transmitted in the 40-MHz channel width. To trigger transmission of a UL MU PPDU in an 80-MHz bandwidth, a poll frame triggering the UL MU transmission may be transmitted in the 80-MHz channel width.

If a poll frame triggering UL MU transmission is configured in the NON-HT format, the poll frame may be transmitted in an X-MHz NON-HT duplicate PPDU format to trigger UL MU transmission in an X-MHz bandwidth exceeding 20 MHz. As illustrated in the examples of FIGS. 16 to 19, a UL MU-MIMO Poll frame may be transmitted simultaneously in the NON-HT duplicate PPDU format in a total 40-MHz channel bandwidth (i.e., on a lower 20-MHz channel and a higher 20-MHz channel) in order to trigger transmission of a UL MU-MIMO PPDU in the 40-MHz bandwidth. If UL MU-MIMO PPDU transmission in an 80-MHz bandwidth is to be triggered, a UL MU-MIMO Poll frame may be transmitted simultaneously in the NON-HT duplicate PPDU format in a total 80-MHz channel bandwidth (i.e., on four 20-MHz channels).

If the AP transmits a poll frame triggering UL MU transmission in a NON-HT Duplicate PPDU format, the AP may set a TXVECTOR parameter, CH_BANDWIDTH_IN_NON_HT of the poll frame to a value indicating a total bandwidth requested for the UL MU transmission. The TXVECTOR CH_BANDWIDTH_IN_NON_HT parameter may have a value indicating one of CBW20, CBW40, CBW80, CBW160, and CBW80+80 as the total transmission bandwidth of the poll frame. The value of the TXVECTOR CH_BANDWIDTH_IN_NON_HT parameter may be used as a seed value for a scrambling sequence of the poll frame. Accordingly, upon receipt of the poll frame triggering UL MU transmission, an STA may determine the value of an RXVECTOR parameter, CH_BANDWIDTH_IN_NON_HT based on the scrambling sequence of the received poll frame and then determine the size of a total bandwidth requested for the UL MU transmission.

If a poll frame triggering UL MU transmission is transmitted in a total bandwidth requested for the UL MU transmission, in a HE PPDU format instead of the NON-HT duplicate PPDU format, a value indicating the total bandwidth requested for the UL MU PPDU transmission may be transmitted to destination STAs in a BandWidth (BW) field included in a HE-SIG field (e.g., HE-SIG-A or HE-SIG-B) of the HE PPDU format.

Upon receipt of a poll frame triggering UL MU transmission, STAs may determine based on information included in the poll frame whether they have been requested for the UL MU transmission. An STA, which has been requested for the UL MU transmission, may transmit a UL MU PPDU to the AP during a time period indicated by the poll frame. The STA may determine a transmission bandwidth for the UL MU PPDU based on the information provided by the poll frame.

Figure 16:
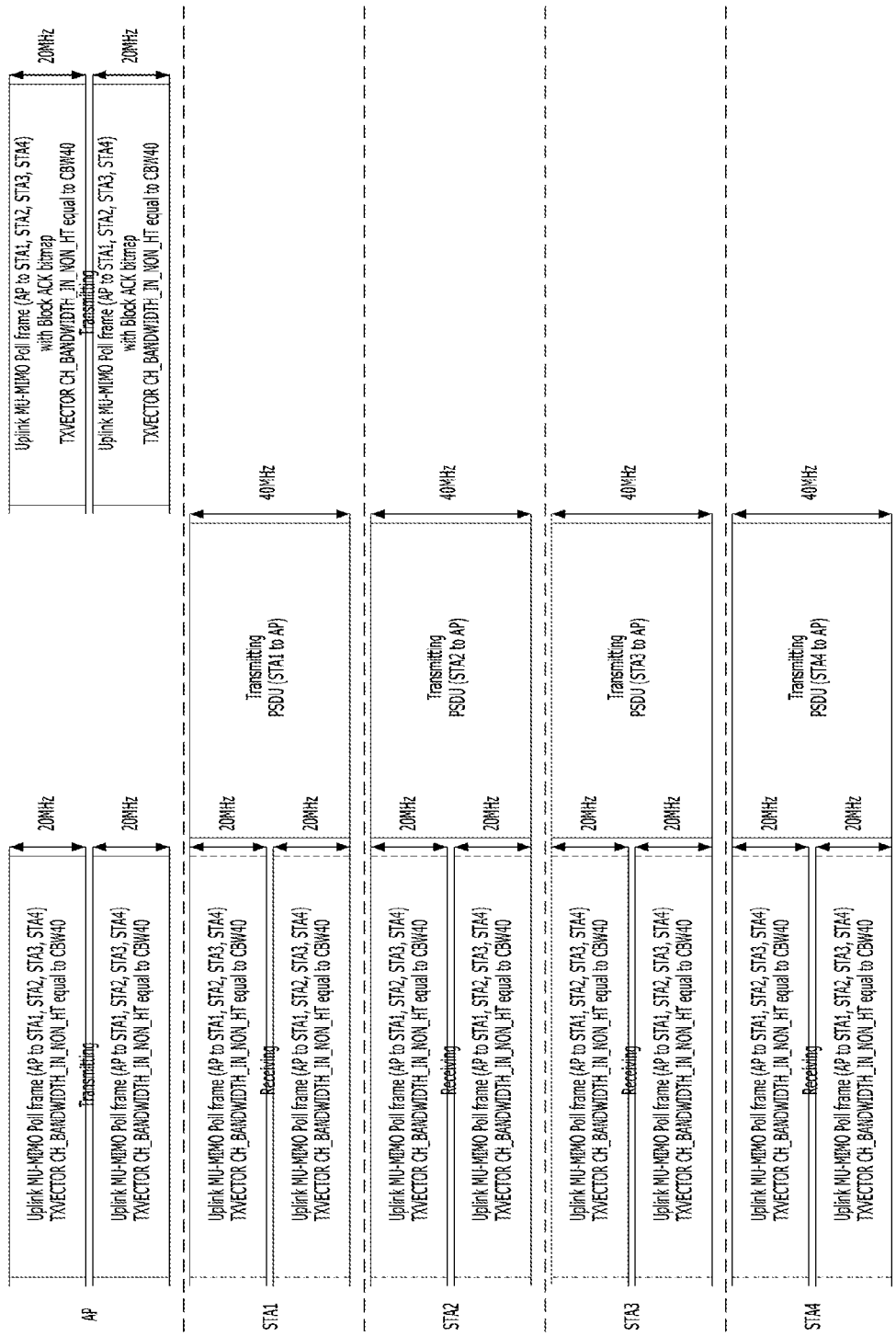
FIGS. 16 to 19 depict determination of a channel width for Uplink (UL) Multi-User (MU) transmission according to the present disclosure.

In the example of FIG. 16, each of STA1, STA2, STA3, and STA4 may receive a poll frame in a total 40-MHz bandwidth, check that the RXVECTOR CH_BANDWIDTH_IN_NON_HT parameter of the received poll frame is set to a value indicating CBW40, and STA1, STA2, STA3, and STA4 may simultaneously transmit a UL MU-MIMO PPDU in the total 40-MHz bandwidth. The poll frame may include information about a subchannel allocated to each of the plurality of STAs in addition to indicating that the total bandwidth of the UL MU transmission is 40 MHz. Accordingly, each of the plurality of STAs may simultaneously transmit a UL OFDMA PPDU including a data unit transmitted on a subchannel allocated to the STA on an entire 40-MHz channel.

Upon receipt of the UL MU transmission from the plurality of STAs, the AP may transmit ACK information to the plurality of STAs in response to the received UL MU PPDU. Also, the AP may transmit information triggering UL MU transmission of the plurality of STAs to the plurality of STAs, along with the ACK information for the STAs. For example, a block ACK frame may further include information triggering additional UL MU transmission for an STA, or a poll frame triggering the additional UL MU transmission for the STA may include the ACK information. That is, the AP may include a poll frame triggering UL MU transmission and a block ACK frame in one PPDU. The poll frame transmitted along with the block ACK frame may be transmitted in the NON-HT duplicate PPDU format on the 40-MHz channel. In this case, the AP may set the TXVECTOR CH_BANDWIDTH_IN_NON_HT parameter of the poll frame to a value indicating CBW40. Or the poll frame transmitted along with the block ACK frame may be configured in the HE PPDU format transmitted on the 40-MHz channel.

Figure 17:
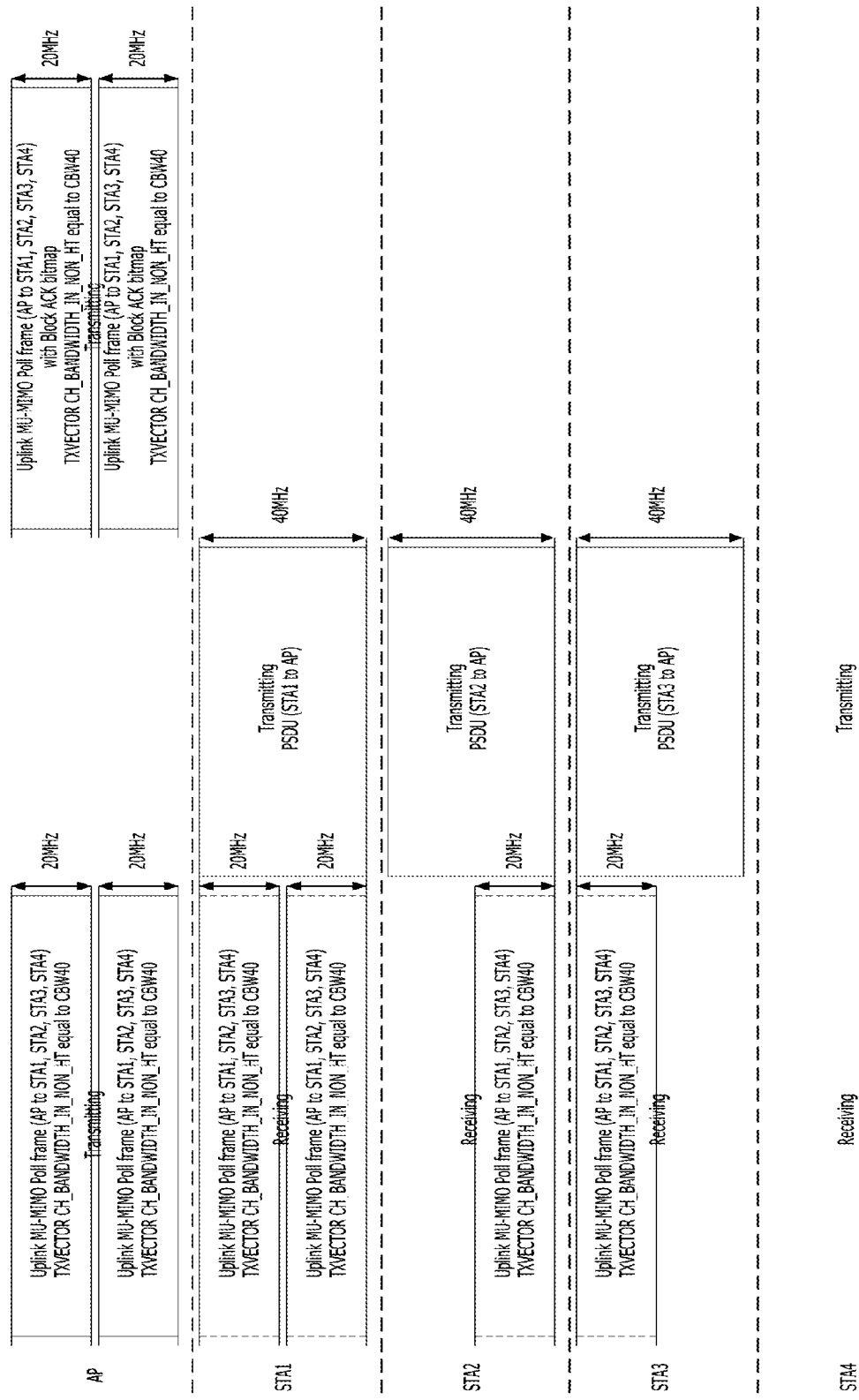

In the example of FIG. 17, in the case where a poll frame triggering UL MU transmission is transmitted in 20-MHz NON-HT duplicate PPDUs on an entire 40-MHz channel, a part of destination STAs of the poll frame may receive the poll frame only on a part of the 40-MHz channel. For example, although STA1 receives both of the 20-MHz NON-HT duplicate PPDUs in the total bandwidth of the 40-MHz channel, STA2 may receive only a 20-MHz NON-HT duplicate PPDU on the lower 20-MHz channel of the 40-MHz channel, failing to receive a 20-MHz NON-HT duplicate PPDU on the higher 20-MHz channel of the 40-MHz channel. STA3 may receive only the 20-MHz NON-HT duplicate PPDU on the higher 20-MHz channel of the 40-MHz channel, failing to receive the 20-MHz NON-HT duplicate PPDU on the lower 20-MHz channel of the 40-MHz channel. STA4 may not receive either of the 20-MHz NON-HT duplicate PPDUs in the total bandwidth of the 40-MHz channel.

In this case, since STA4 has not received the poll frame triggering UL MU transmission at all, STA4 may not start the UL MU transmission. On the other hand, each of STA2 and STA3, which has received a 20-MHz NON-HT duplicate PPDU on a channel having a part of the 40-MHz channel bandwidth, the STA may determine based on information included in the poll frame that the STA has been requested for the UL MU transmission and may acquire information about a bandwidth for the UL MU transmission. Accordingly, even though STA2 and STA3 have received the poll frame triggering the UL MU transmission only in partial 20-MHz channel bandwidths out of the total 40-MHz channel bandwidth, STA2 and STA3 may transmit a 40-MHz UL MU-MIMO PPDU if the poll frame indicates 40 MHz as the UL MU transmission bandwidth. That is, the STAs may perform the UL MU transmission in the channel width (e.g., 40 MHz) indicated by information (e.g., the RXVECTOR parameter, CH_BANDWIDTH_IN_NON_HT) indicating a bandwidth for the UL MU transmission included in the received poll frame irrespective of the bandwidth (e.g., 20 MHz) in which the STAs have received the poll frame triggering the UL MU transmission.

In a high-density WLAN environment, STAs which have received a poll frame triggering UL MU transmission may have different actual available bandwidths. A UL MU transmission receiver, the AP may determine a transmittable channel bandwidth within a current BSS according to EDCA before transmitting the poll frame triggering the UL MU transmission. The AP may transmit the poll frame triggering the UL MU transmission to a plurality of STAs in a bandwidth equal to or smaller than the determined transmittable channel bandwidth. Among the plurality of STAs, however, an STA may have an actual available bandwidth (e.g., the actual available bandwidth may be determined by virtual carrier sensing (e.g., NAV check), physical carrier sensing (e.g., CCA), and a bandwidth in which the poll frame has been received successfully)) smaller than the transmittable bandwidth determined by the AP. If the STA transmits a UL MU PPDU in the bandwidth for the UL MU transmission (i.e., a bandwidth larger than the available bandwidth) indicated by the poll frame, total system performance may be degraded due to collision with transmission from another STA.

Therefore, the STA which has received the poll frame triggering the UL MU transmission may compare the bandwidth for the UL MU transmission indicated by the poll frame (hereinafter, referred to as the "indication bandwidth") with the bandwidth available to the STA (hereinafter, referred to as the "available bandwidth") and determine a bandwidth for use in the UL MU transmission according to whether one of the bandwidths is larger than the other (or whether the bandwidths are equal). In this case, the plurality of STAs participating in the UL MU transmission may determine different UL MU transmission bandwidths.

Figure 18:
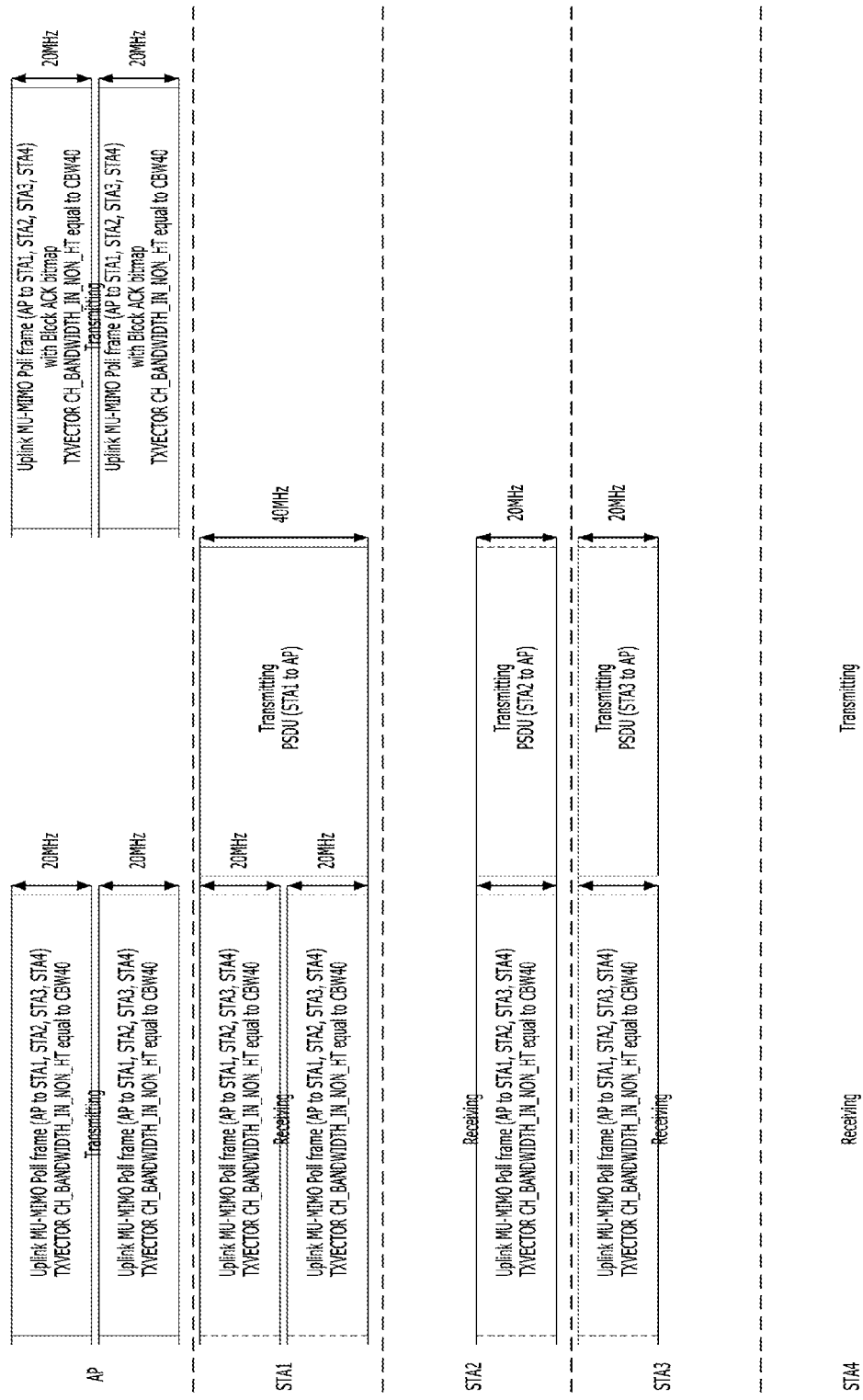

FIG. 18 illustrates a case in which STAs participating in UL MU transmission have different transmission bandwidths for a UL MU PPDU, by way of example. If STA2 and STA3 receive 20-MHz NON-HT duplicate PPDUs on channels each having a part of a 40-MHz channel bandwidth, STA2 and STA3 may determine based on information included in a poll frame that they have been requested for the UL MU transmission and may also acquire information about a bandwidth (e.g., 40 MHz) for the UL MU transmission. STA2 and STA3 may determine their available bandwidths according to a bandwidth (i.e., 20 MHz) in which they have received the poll frame successfully. In this case, each of STA2 and STA3 may transmit a UL MU PPDU according to their available bandwidths (i.e., 20 MHz) instead of the indication bandwidth (i.e., 40 MHz) indicated by the poll frame.

That is, if an indication bandwidth for UL MU transmission, indicated by a received poll frame triggering UL MU transmission (e.g., a bandwidth indicated by the RXVECTOR parameter, CH_BANDWIDTH_IN_NON_HT) is larger than the available bandwidth of an STA (e.g., a bandwidth in which the poll frame has been actually received, a channel bandwidth that has been determined to be idle by a NAV check, or a channel bandwidth that has been determined to be idle by physical CCA), the STA may transmit a UL MU PPDU in the available bandwidth, instead of the indication bandwidth. As a consequence, STA1, STA2, and STA3 may transmit a UL MU PPDU in different bandwidths, 40 MHz, 20 MHz, and 20 MHz, respectively in the example of FIG. 18.

If STAs participating in UL MU transmission have different channel widths for a UL MU PPDU, information indicating the channel widths may be included in a HE-SIG-B or HE-SIG-C field including user-specific information of the UL MU PPDU, not in a HE-SIG-A field including common control information of the UL MU PPDU. In this case, the AP attempts to perform channel estimation, assuming that a HE-STF and a HE-LTF are transmitted in a total bandwidth requested for the UL MU transmission (i.e., an indication bandwidth for the UL MU transmission indicated by information included in the poll frame triggering the UL MU transmission) until before determining the channel widths of the UL MU PPDU received from the STAs. Because the channel estimation is based on the HE-STF and HE-LTF at positions different from the actual positions (e.g., the positions of pilot tones) of the HE-STF and HE-LTF transmitted in the UL MU PPDU, the accuracy or reliability of the channel estimation for PSDU reception is decreased.

In this case, if an available bandwidth of an STA (e.g., a bandwidth in which the poll frame has been received actually, a channel bandwidth determined to be idle by a NAV check, or a channel bandwidth determined to be idle by physical CCA) is smaller than an indication bandwidth (i.e., an indication bandwidth for UL MU transmission indicated by information included in the poll frame triggering the UL MU transmission), the STA may not perform the UL MU transmission.

Figure 19:
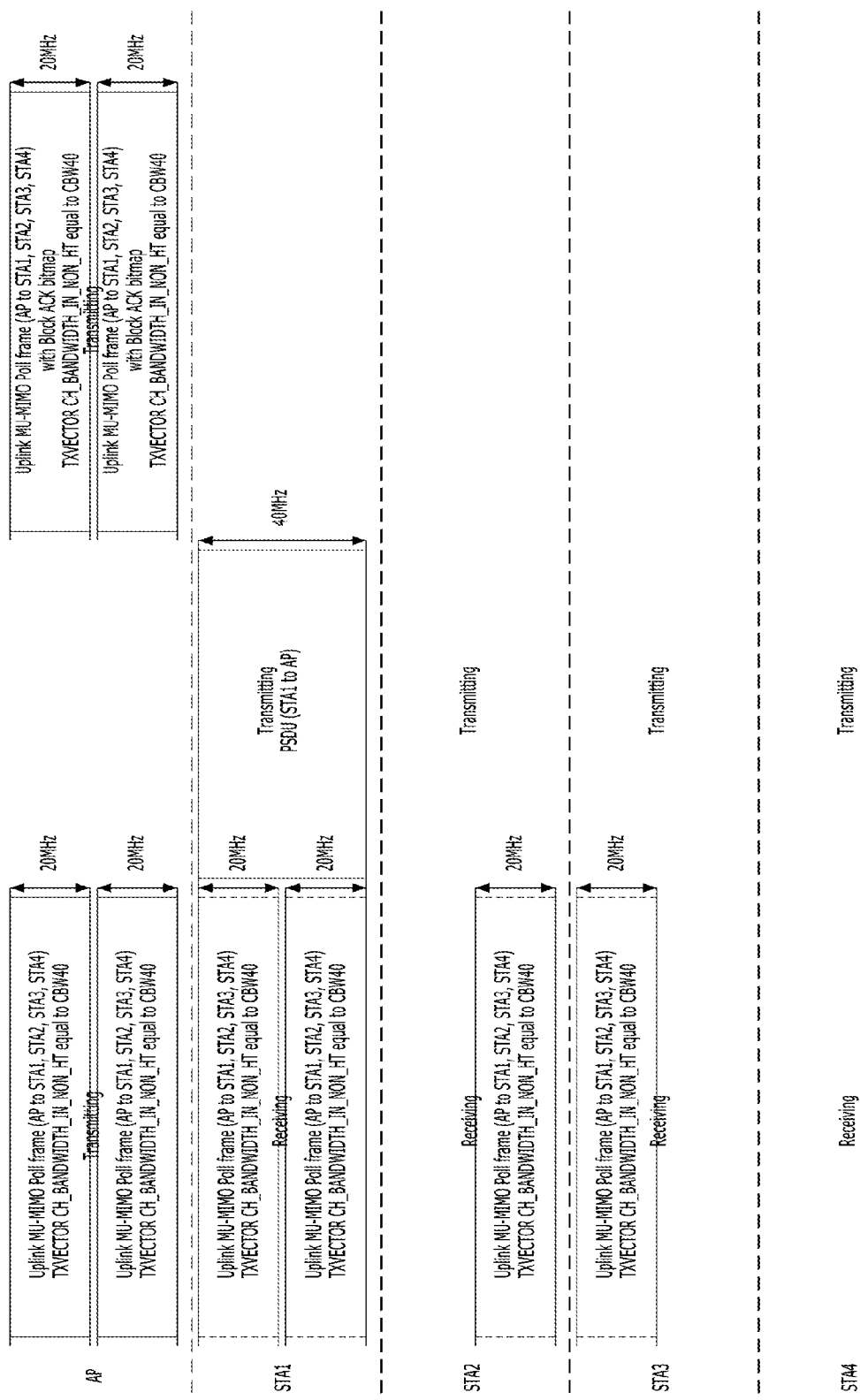

In the example of FIG. 19, if some of destination STAs of a poll frame triggering UL MU transmission, such as STA2 and STA3, receive the poll frame only in a part of a total bandwidth requested for transmission of a UL MU PPDU, each of the STAs may compare its available bandwidth with an indication bandwidth. If the available bandwidth is different from (e.g., smaller than) the indication bandwidth, the STA may not transmit the UL MU PPDU. In other words, only if the available bandwidth of an STA requested for the UL MU transmission is equal to the indication bandwidth, the STA may perform the UL MU transmission. In this case, the transmission channel width of the UL MU PPDU may be determined according to the indication bandwidth indicated by the poll frame (e.g., a channel width indicated by the RXVECTOR parameter, CH_BANDWIDTH_IN_NON_HT) of the poll frame).

In another example of the present disclosure, if the AP transmits a poll frame triggering UL MU transmission to a plurality of STAs and then fails to receive a UL MU PPDU from a part or all of the STAs, the AP may transmit an additional poll frame triggering the UL MU transmission to the corresponding STAs. If the available bandwidth of an STA receiving the additional poll frame is different from (e.g., smaller than) an indication bandwidth, the STA does not still perform the UL MU transmission, resulting in repeated transmissions of the poll frame and thus degradation of the total system performance.

In this case, if the available bandwidth of the STA receiving the poll frame triggering the UL MU transmission is different from (e.g., smaller than) the indication bandwidth, the STA may transmit information indicating its available bandwidth to the AP. Information indicating the available bandwidths of STAs may be included in a HE-SIG field (e.g., HE-SIG-B or HE-SIG-C) of a UL MU PPDU. Further, the UL MU PPDU including the information indicating the available bandwidths of the STAs may be configured as an NDP frame (or Null frame) without any PSDU.

As described above, upon receipt of a poll frame triggering UL MU transmission, an STA may determine whether to perform the UL MU transmission and (if the STA determines to perform the UL MU transmission) a bandwidth for the UL MU transmission based on both of its available bandwidth and an indication bandwidth indicated by trigger information (or information included in the poll frame).

If an available bandwidth of an STA among a plurality of STAs participating in the UL MU transmission is equal to or larger than the indication bandwidth, the STA may determine to perform the UL MU transmission and determine a bandwidth for the UL MU transmission based on the indication bandwidth.

If an available bandwidth of an STA among the plurality of STAs participating in the UL MU transmission is smaller than the indication bandwidth, the STA may determine not to perform the UL MU transmission, determine to perform the UL MU transmission according to the available bandwidth, or transmit information about the available bandwidth to the AP in response to the frame including information about the indication bandwidth.

Additionally, before the AP transmits the frame including information about the indication bandwidth for the UL MU transmission (e.g., a poll frame triggering the UL MU transmission, a trigger frame, or a UL MU Poll Confirm frame described below) to a plurality of STAs, a procedure for exchanging or negotiating information about the available bandwidth of the AP and information about the available bandwidths of the plurality of STAs may be performed. The AP may transmit an RTS frame or UL MU Poll Request frame including information about its available bandwidth to the plurality of STAs requested to participate in the UL MU transmission. Upon receipt of the UL MU Poll Request frame, each of the STAs may transmit a CTS frame or UL MU Poll Response frame including information about its available bandwidth to the AP. Accordingly, the AP may dynamically determine a bandwidth for the UL MU transmission of the STAs based on all of the available bandwidths of the AP and the STAs. The AP may transmit a UL MU Poll frame (a UL MU Poll Confirm frame or trigger frame) including information about the indication bandwidth for the UL MU transmission to the plurality of STAs. Upon receipt of the UL MU Poll frame for the UL MU transmission, an STA may determine whether to perform the UL MU transmission and (if the STA determines to perform the UL MU transmission) determine a bandwidth for the UL MU transmission based on both the indication bandwidth indicated by the trigger information (or the information included in the UL MU Poll frame) and its available bandwidth, as described before with reference to the examples of the present disclosure.

Now, a description will be given of additional examples of the present disclosure regarding dynamic bandwidth determination (or dynamic bandwidth adaptation) for UL MU transmission.

First, dynamic bandwidth determination for UL SU transmission or DL SU transmission, not UL MU transmission will be described. Dynamic bandwidth determination for SU transmission means an operation for determining a common bandwidth (or channel width) for a transmitting STA and a receiving STA because a transmission bandwidth of the STA transmitting a PPDU may be different from an available bandwidth of the STA receiving the PPDU.

For example, the transmitting STA may configure and transmit an RTS frame in a NON-HT PPDU or NON-HT duplicate PPDU format. Herein, the RTS frame may include a dynamic bandwidth field. The dynamic bandwidth field may include information about the size of a transmission bandwidth determined based on a channel that the transmitting STA determines to be idle. Upon receipt of the RTS frame, if a virtual sensing result of the receiving STA indicates a channel idle state (e.g., a NAV value is not a non-zero value) and a physical carrier sensing (CCA) result of a secondary channel(s) during a PIFS before the RTS frame starts to be transmitted, the receiving STA may configure and transmit a CTS frame in the NON-HT PPDU or NON-HT duplicate PPDU format in a bandwidth including the idle secondary channel(s). Herein, the size of the channel bandwidth of the CTS frame may be equal to or smaller than the size of the bandwidth indicated by the dynamic bandwidth field of the RTS frame (i.e., the bandwidth that the transmitting STA has determined to be idle).

Although the dynamic bandwidth determination method for SU transmission enables dynamic determination of a common channel bandwidth between one transmitting STA and one receiving STA, it is difficult to apply this method to a case in which a plurality of transmitting STAs perform simultaneous transmission such as UL MU transmission. Accordingly, there is a need for a new method for determining a bandwidth dynamically in consideration of available bandwidths of a plurality of STAs participating in UL MU transmission.

Figure 20:
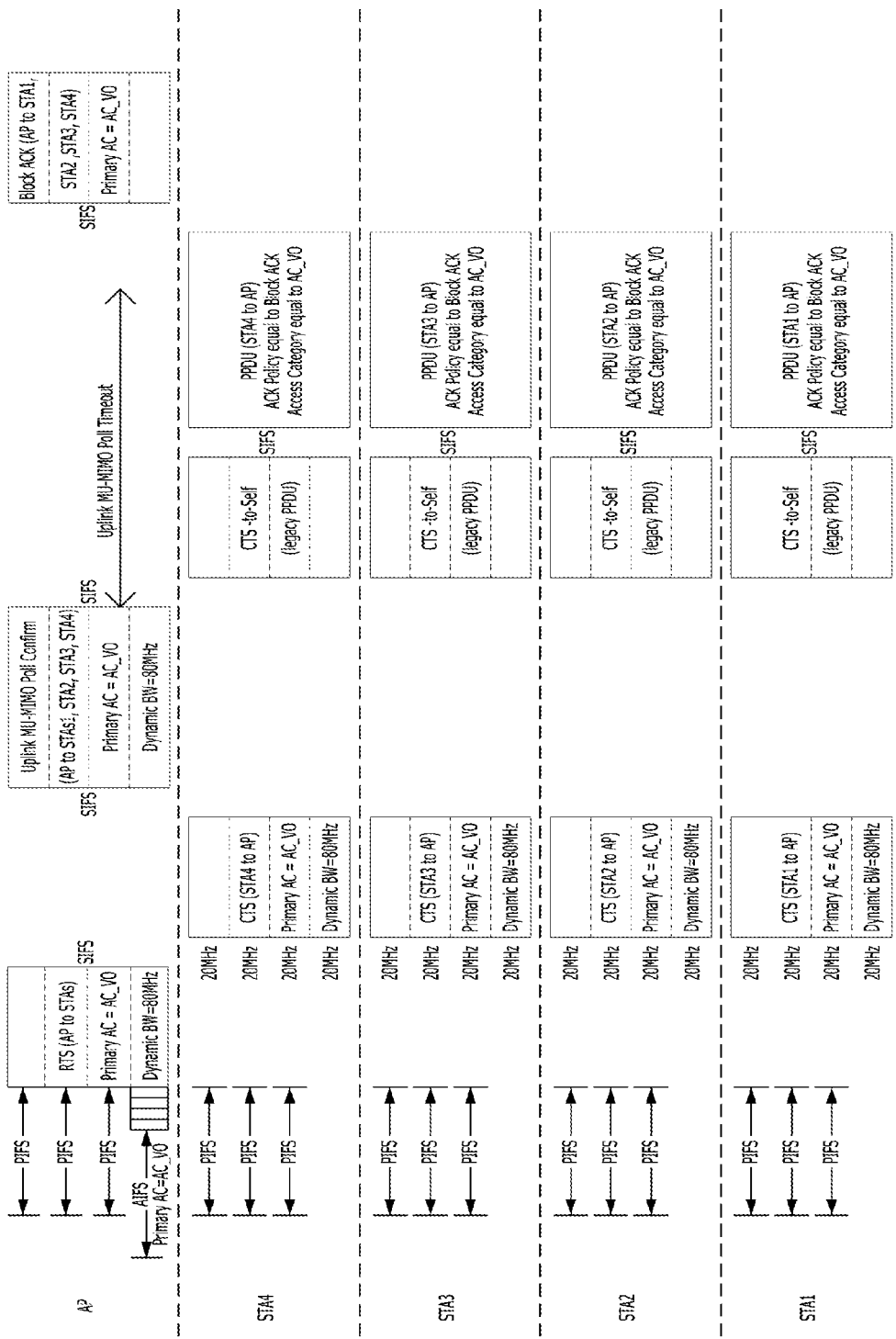
FIGS. 20, 21, and 22 depict examples of dynamically determining a bandwidth for UL MU transmission according to the present disclosure.
Figure 21:
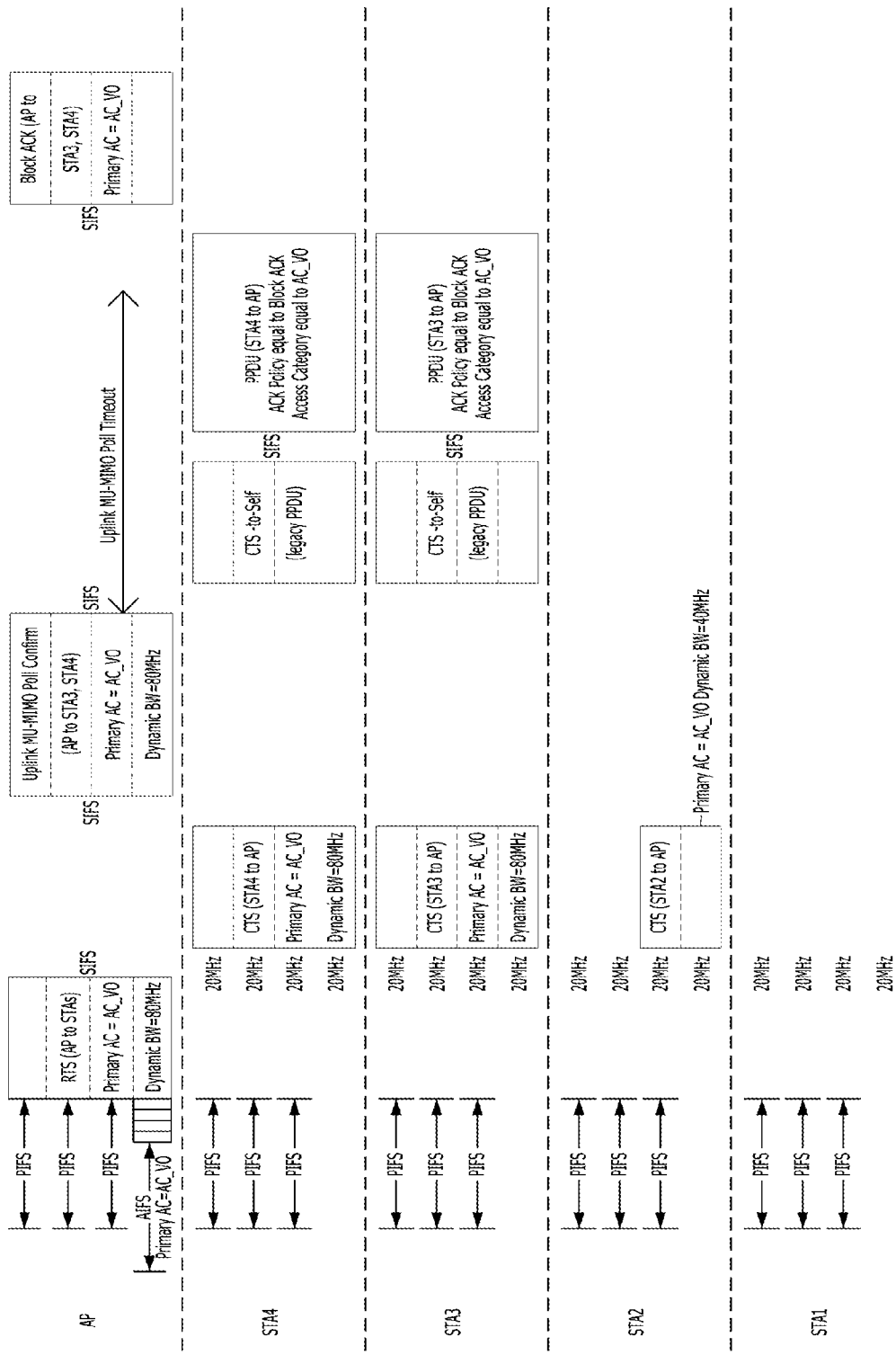
Figure 22:
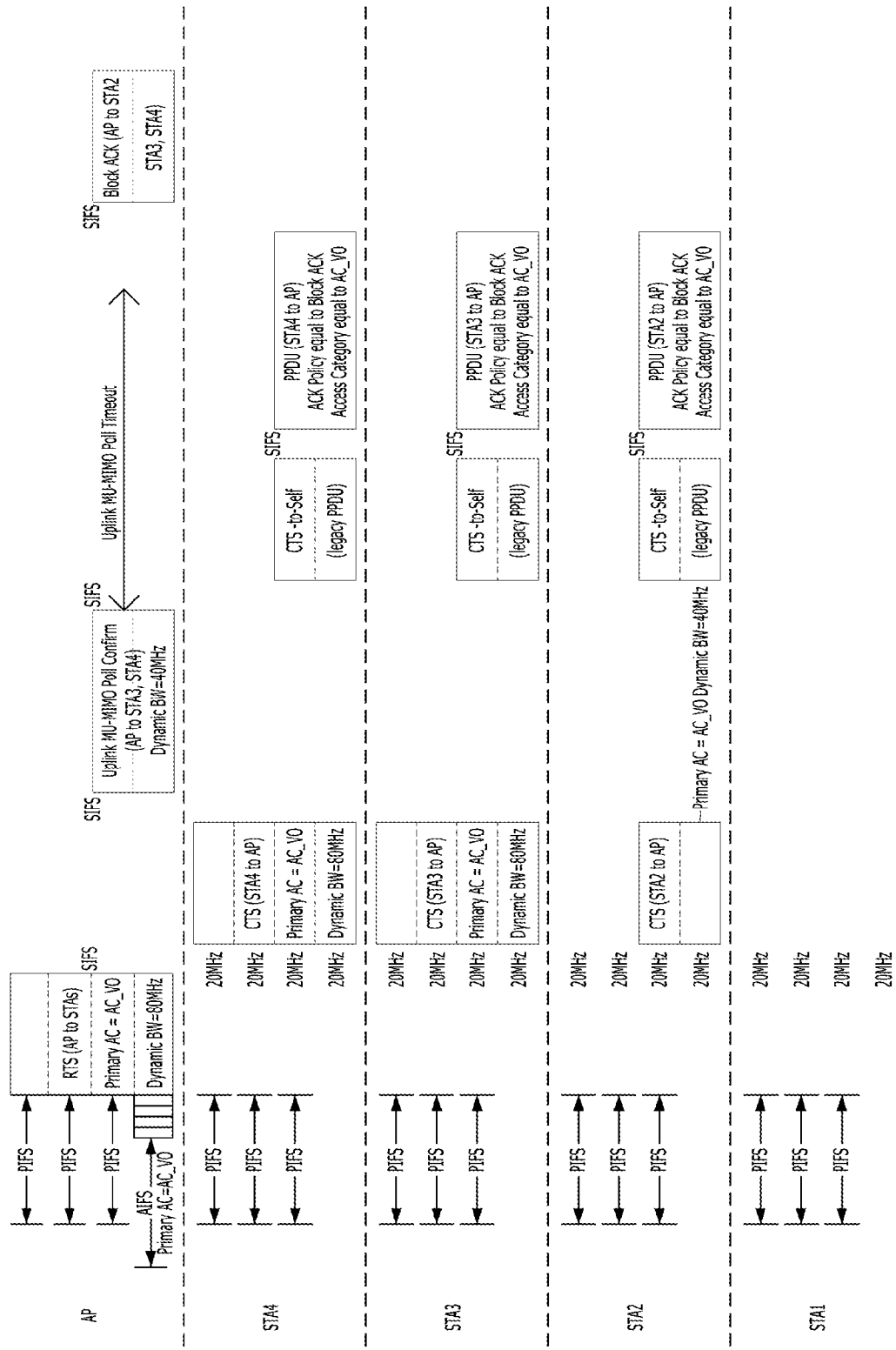

FIGS. 20, 21, and 22 depict examples of dynamically determining a bandwidth for UL MU transmission according to the present disclosure.

FIGS. 20, 21, and 22 illustrate UL MU-MIMO transmission as an example of UL MU transmission. However, the examples of the present disclosure may also be applied in the same manner to UL OFDMA transmission in which one transmission channel is divided into a plurality of subchannels and each STA performs simultaneous UL transmission on an allocated subchannel.

According to a dynamic bandwidth determination method for UL MU transmission, upon acquisition of a TXOP in a contention-based channel access scheme (e.g., EDCA), an AP may transmit an RTS frame or a UL MU Poll Request frame in a bandwidth including a secondary channel(s) indicated as idle by a physical carrier sensing result of the secondary channel(s). The RTS frame or the UL MU Poll Request frame may be configured and transmitted in a NON-HT PPDU or NON-HT duplicate PPDU format. The RTS frame or the UL MU Poll Request frame may include a dynamic bandwidth field and the dynamic bandwidth field may include information about the size of an available bandwidth of the AP determined based on a channel that the AP determines to be idle. The AP may transmit the RTS frame or the UL MU Poll Request frame to STAs requested to participate in the UL MU transmission.

Upon receipt of the RTS frame or the UL MU Poll Request frame including the dynamic bandwidth field, each of the STAs may configure and transmit a CTS frame or a UL MU Poll Response frame in the NON-HT PPDU or NON-HT duplicate PPDU format in a bandwidth including an idle secondary channel(s), if a virtual carrier sensing result of the STA indicates the idle state (e.g., if a NAV value is not a non-zero value) and a physical carrier sensing (i.e., CCA) result of the secondary channel(s) indicates the ide state during a PIFS before the transmission of the RTS frame or the UL MU Poll Request frame starts. The size of a channel bandwidth of the RTS frame or the UL MU Poll Request frame may be equal to or smaller than the size of the bandwidth indicated by the dynamic bandwidth field of the RTS frame or the UL MU Poll Request frame.

The CTS frame or the UL MU Poll Response frame may include a dynamic bandwidth field, and the dynamic bandwidth field may include information about an available bandwidth of an STA transmitting the CTS frame or the UL MU Poll Response frame, determined based on a channel that the STA determines to be idle.

Further, the values of dynamic bandwidth fields included in CTS frames or UL MU Poll Response frames transmitted by the plurality of STAs participating in the UL MU transmission may be different. To enable the AP to receive the CTS frames or the UL MU Poll Response frames from the plurality of STAs, the plurality of STAs may transmit the CTS frames or the UL MU Poll Response frames in a UL MU PPDU format. For this purpose, the RTS frame or the UL MU Poll Request frame may further include information that triggers UL MU transmission of the CTS frames or the UL MU Poll Response frames.

In addition, to enable the AP to successfully receive the CTS frames or the UL MU Poll Response frames simultaneously transmitted by the plurality of STAs, random numbers input to the scrambling sequence initial states of the CTS frames or the UL MU Poll Response frames may be set to the same value for the plurality of STAs.

The AP may acquire the information about the available bandwidths of the plurality of STAs participating in the UL MU transmission from the CTS frames or the UL MU Poll Response frames. The AP may determine an actual transmission bandwidth for use in the UL MU transmission based on the information about the available bandwidths of the plurality of STAs. The size of the transmission bandwidth determined by the AP may be equal to or smaller than the size of the available bandwidth reported to the AP in a CTS frame or a UL MU Poll Response frame by each of the STAs participating in the UL MU transmission. Further, the transmission bandwidth determined by the AP may be equal to or smaller than the available bandwidth of the AP indicated to the plurality of STAs by the RTS frame or the UL MU Poll Request frame.

The AP may indicate the transmission bandwidth determined based on the available bandwidths of the plurality of STAs to the plurality of STAs participating in the UL MU transmission by a UL MU Poll Confirm frame. That is, the plurality of STAs may perform the UL MU transmission in the bandwidth for the UL MU transmission (i.e., the indication bandwidth), indicated by the UL MU Poll Confirm frame.

FIG. 20 depicts an example of dynamically determining a bandwidth for UL MU transmission.

Upon acquisition of a TXOP in a contention-based channel access scheme (e.g., EDCA), an AP may perform physical carrier sensing on a secondary channel(s). Specifically, if a channel is idle on a primary channel (e.g., a lowest-frequency 20-MHz channel in a 80-MHz channel) during an AIFS corresponding to a primary AC set to Access Category_Voice (AC_VO), the AP may perform a backoff procedure. If a backoff timer reaches 0 and a secondary 20-MHz channel and a secondary 40-MHz channel are idle during a PIFS shortly before the corresponding time, the AP may determine that the 80-MHz channel is idle. Accordingly, the AP may configure and transmit an RTS frame (or UL MU Poll Request frame) in a NON-HT PPDU or NON-HT duplicate PPDU format on the 80-MHz channel. A dynamic bandwidth field may be set to a value indicating 80 MHz, a primary AC may be set to a value indicating AC_VO, and STA1, STA2, STA3 and STA4 requested to participate in transmission of a UL MU PPDU may be set as destination STAs, in the RTS frame (or MU Poll Request frame) transmitted by the AP.

Upon receipt of the RTS frame (or MU Poll Request frame), if all virtual carrier sensing results indicate a channel idle state (e.g., a NAV value is not a non-zero value), physical carrier sensing results of all secondary channels (i.e., the secondary 20-MHz channel and the secondary 40-MHz channel) indicate that the 80-MHz channel is in the channel idle state during a PIFS before the transmission of the RTS frame (or UL MU Poll Request frame) starts, each of STA1, STA2, STA3, and STA4 may configure and transmit a CTS frame (or UL MU Poll Response frame) in a UL MU PPDU format on the 80-MHz channel. A dynamic bandwidth field may be set to a value indicating 80 MHz and a primary AC may be set to a value indicating AC_VO in the CTS frame (or UL MU Poll Response frame) transmitted by each of the STAs.

When the AP determines that all of the available bandwidths of the plurality of STAs requested to participate in the UL MU transmission are 80 MHz from the dynamic bandwidth fields of the CTS frames (or UL MU Poll Response frames) received from the plurality of STAs, the AP may determine a transmission bandwidth for use in actual transmission of a UL MU PPDU to be 80 MHz. Accordingly, the AP may transmit a UL MU Poll Confirm frame to STA1, STA2, STA3, and STA4. A dynamic bandwidth field may be set to a value indicating 80 MHz and a primacy AC may be set to a value indicating AC_VO in the UL MU Poll Confirm frame transmitted by the AP.

Upon receipt of the UL MU Poll Confirm frame, STA1, STA2, STA3, and STA4 may announce NAV information around them in order to protect a channel for transmission of a UL MU PPDU from a third-party STA (e.g., a legacy third-party STA) that does not listen to the UL MU PPDU. For this purpose, each of the STAs may transmit a CTS-to-Self frame (i.e., a CTS frame with RA set to the MAC address of the STA) on the 80-MHz channel. That is, the CTS-to-Self frame may be transmitted in a legacy PPDU (e.g., a NON-HT PPDU or a NON-HT duplicate PPDU). Subsequently, each of STA1, STA2, STA3, and STA4 may transmit a UL MU PPDU, and an ACK Policy may be set to block ACK and an AC may be set to a value indicating AC_VO in the UL MU PPDU.

Or upon receipt of the UL MU Poll Confirm frame, the plurality of STAs may transmit a UL MU PPDU immediately an SIFS after reception of the UL MU Poll Confirm frame, instead of transmitting CTS-to-Self frames. In this case, the channel for use in the UL MU transmission may be protected from a third-party STA by the duration value of the legacy preamble (e.g., L-SIG) of the UL MU PPDU.

After transmitting the UL MU Poll Confirm frame, the AP may monitor whether the UL MU transmission has been received from the plurality of STAs during a UL MU poll timeout period for the UL MU transmission. If the AP fails to receive the UL MU transmission during the timeout period, the AP may transmit an additional UL MU Poll Confirm frame.

On the other hand, upon receipt of the UL MU transmission from the plurality of STAs, the AP may transmit a block ACK frame to the plurality of STAs on the 80-MHz channel. Herein, the primary AC of the block ACK frame may be set to a value indicating AC_VO.

FIG. 21 depicts another example of dynamically determining a bandwidth for UL MU transmission.

The AP determines its available channel bandwidth to be 80 MHz and transmits an RTS frame (or UL MU Poll Request frame) with a dynamic bandwidth field set to a value indicating 80 MHz to STA1, STA2, STA3, and STA4, as in FIG. 20. Thus, this operation will not be described in detail herein.

It is assumed that each of STA2, STA3, and STA4 has a virtual carrier sensing result indicating a channel idle state (e.g., a NAV value is not a non-zero value) and STA1 has a virtual carrier sensing result indicating a channel busy state (e.g., a NAV value is a non-zero value). That is, STA1 may determine that there is no available bandwidth for it (i.e., the available bandwidth is 0), whereas STA2, STA3, and STA4 may determine that they have available bandwidths.

In this case, if for each of STA3 and STA4 among STA2, STA3, and STA4 having virtual carrier sensing results indicating the channel idle state, a physical carrier sensing result of all secondary channels (i.e., the secondary 20-MHz channel and the secondary 40-MHz channel) indicates that the 80-MHz channel is idle during a PIFS before the transmission of the RTS frame (or UL MU Poll Request frame) starts, the STA may configure and transmit a CTS frame (or UL MU Poll Response frame) in a UL MU PPDU format on the 80-MHz channel. Herein, a dynamic bandwidth field may be set to a value indicating 80 MHz and a primary AC may be set to a value indicating AC_VO in the CTS frame (or UL MU Poll Response frame) transmitted by each of STA3 and STA4.

Among STA2, STA3, and STA4 having virtual carrier sensing results indicating the channel idle state, if STA2 has a physical carrier sensing result of the secondary 20-MHz channel indicating the channel idle state and a physical carrier sensing result of the secondary 40-MHz channel indicating the channel busy state during a PIFS before the transmission of the RTS frame (or UL MU Poll Request frame) starts, STA2 may determine that a 40-MHz channel is idle as a result of the physical carrier sensing. In this case, STA2 may configure and transmit a CTS frame (or UL MU Poll Response frame) in a UL MU PPDU format on the 40-MHz channel. Herein, a dynamic bandwidth field may be set to a value indicating 40 MHz and a primary AC may be set to a value indicating AC_VO in the CTS frame (or UL MU Poll Response frame) transmitted by STA2.

As described above, each of STA2, STA3, and STA4, which have determined that they have available bandwidths according to the virtual carrier sensing results, may determine its available bandwidth (e.g., the available bandwidths of STA2, STA3, and STA4 are 40, 80, and 80 MHz, respectively) and transmit information about the available bandwidth to the AP.

On the other hand, STA1 having a virtual carrier sensing result indicating the channel busy state (i.e., determining the absence of an available bandwidth or an available bandwidth of 0) may not respond to the RTS frame (or UL MU Poll Request frame) and may not participate in dynamic bandwidth determination for the UL MU transmission.

After determining from the dynamic bandwidth fields of the CTS frames (or UL MU Poll Response frames) received from the plurality of STAs that the available bandwidths of STA2, STA3, and STA4 among the plurality of STAs requested to participate in the UL MU transmission are 40, 80, and 80 MHz, respectively, the AP may determine a transmission bandwidth for use in actual UL MU PPDU transmission to be 80 MHz. That is, the AP may determine not to trigger the UL MU transmission for STA2 having an available bandwidth of 40 MHz and to trigger the UL MU transmission for STA3 and STA4 each having an available bandwidth of 80 MHz, in consideration of the available bandwidth of the AP, 80 MHz. Therefore, the AP may transmit a UL MU Poll Confirm frame to STA3 and STA4 on the 80-MHz channel. Herein, a dynamic bandwidth field may be set to a value indicating 80 MHz and a primary AC may be set to a value indicating AC_VO in the UL MU Poll Confirm frame transmitted by the AP.

Upon receipt of the UL MU Poll Confirm frame, each of STA3 and STA4 may determine to perform the UL MU transmission because its available bandwidth (e.g., 80 MHz) is equal to the indication bandwidth (e.g., 80 MHz). Accordingly, each of STA3 and STA4 may transmit a CTS-to-Self frame on the 80-MHz channel and then a UL MU PPDU on the 80-MHz channel. The AP may transmit a block ACK frame to STA3 and STA4 in response to the UL MU PPDU. Or STA3 and STA4 may transmit a UL MU PPDU instead of a CTS-to-Self frame in immediate response to the UL MU Poll Confirm frame. The process of transmitting a UL MU PPDU (or a CTS-to-Self frame and a UL MU PPDU) in response to a UL MU Poll Confirm frame by a plurality of STAs and transmitting a block ACK frame in response to the UL MU PPDU received from the plurality of STAs by an AP is performed in the same manner as in the example of FIG. 20 and thus will not be described in detail herein.

Or the AP may transmit a UL MU Poll Confirm frame including a dynamic bandwidth field set to a value indicating 80 MHz to STA2, STA3, and STA4 on the 80-MHz channel. In this case, each of STA2, STA3, and STA4 may compare its available bandwidth (e.g., a bandwidth indicated by the dynamic bandwidth field of a CTS frame) with an indication bandwidth for UL MU transmission indicated by the UL MU Poll Confirm frame and determine whether to transmit a UL MU PPDU. Because its available bandwidth (e.g., 80 MHz) is equal to the indication bandwidth (e.g., 80 MHz) indicated by the UL MU Poll Confirm frame, each of STA3, and STA4 may perform the UL MU transmission. Meanwhile, STA2 may determine not to perform the UL MU transmission because its available bandwidth (e.g., 40 MHz) is different from (i.e., smaller than) the indication bandwidth (e.g., 80 MHz).

FIG. 22 depicts another example of dynamically determining a bandwidth for UL MU transmission.

As in the example of FIG. 21, the AP determines that its available channel width is 80 MHz and transmits an RTS frame (or UL MU Poll Request frame) with a dynamic bandwidth field set to a value indicating 80 MHz to STA1, STA2, STA3, and STA4. Thus, a redundant description of this operation will not be given herein. Further, among STA1, STA2, STA3, and STA4 receiving the RTS frame (or UL MU Poll Request frame), virtual carrier sensing results of STA2, STA3, and STA4 indicate a channel idle state, a virtual carrier sensing result of STA1 indicates a channel busy state, STA2 has an available bandwidth of 40 MHz, STA3 and STA4 have an available bandwidth of 80 MHz, STA1 does not participate in the UL MU transmission, STA2 transmits a CTS frame (or UL MU Poll Response frame) on a 40-MHz channel, and each of STA3 and STA4 transmits a CTS frame (or UL MU Poll Response frame) on a 80-MHz channel, which is the same as in the example of FIG. 21 and thus will not be described herein to avoid redundancy.

After determining that the available bandwidths of STA2, STA3, and STA4 are 40, 80, and 80 MHz, respectively among the plurality of STAs requested to participate in the UL MU transmission based on the dynamic bandwidth fields of the CTS frames (or UL MU Poll Response frames) received from the plurality of STAs, the AP may determine an actual transmission bandwidth for use in UL MU PPDU transmission to be 40 MHz. That is, the AP may determine to trigger the UL MU transmission for all of STA2 having an available bandwidth of 40 MHz and STA3 and STA4 having an available bandwidth of 80 MHz, in consideration of the available bandwidth of the AP being 80 MHz. Accordingly, the AP may transmit a UL MU Poll Confirm frame to STA2, STA3, and STA4 on a 40-MHz channel. In the UL MU Poll Confirm frame transmitted by the AP, a dynamic bandwidth field may be set to a value indicating 40 MHz and a primacy AC may be set to a value indicating AC_VO.

Upon receipt of the UL MU Poll Confirm frame, each of STA2, STA3, and STA4 may determine to perform the UL MU transmission because its available bandwidth (e.g., 40 MHz or 80 MHz) is equal to or larger than the indication bandwidth (e.g., 40 MHz). Thus, STA2, STA3, and STA4 may transmit CTS-to-Self frames on the 40-MHz channel and then a UL MU PPDU on the 40-MHz channel. The AP may transmit a block ACK frame to STA2, STA3, and STA4 in response to the CTS-to-Self frames. The process of transmitting a UL MU PPDU (or CTS-to-Self frames and a UL MU PPDU) to an AP in response to a UL MU Poll Confirm frame and transmitting a block ACK frame to the plurality of STAs in response to the UL MU PPDU by the AP is performed in a similar manner to in the example of FIG. 20, and thus will not be further described herein to avoid redundancy.

In the dynamic bandwidth determination method for UL MU transmission according to the present disclosure as described above, an AP may provide information about its available bandwidth to a plurality of STAs requested to participate in UL MU transmission and acquire information about an available bandwidth of each of the STAs in response to the transmitted information (an STA having no available bandwidth may not respond to the AP). The AP may determine a bandwidth for the UL MU transmission based on all of the available bandwidths of the plurality of STAs and the available bandwidth of the AP and transmit trigger information indicating the determined bandwidth to the plurality of STAs requested to participate in the UL MU transmission. Accordingly, each of the STAs may compare its available bandwidth with the indication bandwidth indicated by the trigger information and determine whether to perform the UL MU transmission and (when determining to perform the UL MU transmission) a bandwidth for the UL MU transmission based on the comparison result.

Instead of the dynamic bandwidth determination method, a bandwidth for UL MU transmission may be determined statically.

According to a static bandwidth determination method for UL MU transmission, an AP which has acquired a TXOP in a contention-based channel access scheme (e.g., EDCA) may transmit an RTS frame or a UL MU Poll Request frame in a bandwidth including a secondary channel(s) indicated as idle by a physical carrier sensing result of the secondary channel(s). The RTS frame or the UL MU Poll Request frame may be configured and transmitted in a NON-HT PPDU or NON-HT duplicate PPDU format. The RTS frame or the UL MU Poll Request frame may include a static bandwidth field, and the static bandwidth field may include information about the available bandwidth of the AP. The AP may transmit the RTS frame or the UL MU Poll Request frame to STAs requested to participate in UL MU transmission.

Upon receipt of the RTS frame or the UL MU Poll Request frame, each of the STAs may configure and transmit a CTS frame or a UL MU Poll Response frame in a NON-HT PPDU or NON-HT duplicate PPDU format in the same bandwidth as the available bandwidth of the AP including an idle secondary channel(s), indicated by the static bandwidth field, if a virtual carrier sensing result of the STA indicates a channel idle state (e.g., a NAV value is not a non-zero value) and a physical carrier sensing (i.e., CCA) result of the secondary channel(s) during a PIFS before the RTS frame or the UL MU Poll Request frame starts to be transmitted indicates that a channel corresponding to a bandwidth equal to or larger than the available bandwidth of the AP indicated by the static bandwidth field is idle. The size of a channel bandwidth of the CTS frame or the UL MU Poll Response frame may be equal to the size of the bandwidth indicated by the static bandwidth field of the RTS frame or the UL MU Poll Request frame (i.e., the available bandwidth of the AP that the AP determines to be idle).

That is, if its available bandwidth is equal to the bandwidth indicated by the RTS frame or the UL MU Poll Request frame (i.e., the available bandwidth of the AP), an STA receiving the RTS frame or the UL MU Poll Request frame may transmit a CTS frame or a UL MU Poll Response frame to the AP. On the other hand, if its available bandwidth is different from the bandwidth indicated by the RTS frame or the UL MU Poll Request frame (i.e., the available bandwidth of the AP), an STA receiving the RTS frame or the UL MU Poll Request frame may not respond to the AP.

The CTS frame or the UL MU Poll Response frame may include a static bandwidth field, and the static bandwidth field may include information about an available bandwidth of the STA transmitting the CTS frame or the UL MU Poll Response frame (i.e., the same bandwidth as the available bandwidth of the AP indicated by the static bandwidth field of the RTS frame or the UL MU Poll Request frame). In the case where a plurality of STAs transmit CTS frames or UL MU Poll Response frames, the static bandwidth fields of the CTS frames or UL MU Poll Response frames may be set to the same value.

Upon receipt of the CTS frames or the UL MU Poll Response frames from the plurality of STAs, the AP may trigger UL MU transmission by transmitting a UL MU Poll Confirm frame to the plurality of STAs. The UL MU transmission may be performed in the available bandwidth of the AP (i.e., the available bandwidth of the STAs).

For example, if the AP has an available bandwidth of 80 MHz and STA1, STA2, STA3, and STA4 commonly have an available bandwidth of 80 MHz as illustrated in the example of FIG. 20, all of STA1, STA2, STA3, and STA4 may transmit CTS frames (or UL MU Poll Response frames) each having a static bandwidth field to the AP in response to the CTS frame (or the UL MU Poll Request frame). Therefore, the UL MU transmission of STA1, STA2, STA3, and STA4 triggered by the UL MU Poll Confirm frame transmitted by the AP may be performed on an 80-MHz channel.

Or if the AP has an available bandwidth of 80 MHz and STA1, STA2, STA3, and STA4 have available bandwidths of 0, 40, 80, and 80 MHz, respectively as illustrated in the example of FIG. 21 or FIG. 22, STA1 and STA2 may not respond to a CTS frame (or UL MU Poll Request frame) received from the AP, whereas only STA3 and STA4 may transmit CTS frames (or UL MU Poll Response frames) each including a static bandwidth field to the AP. Therefore, UL MU transmission of STA3 and STA4 triggered by a UL MU Poll Confirm frame transmitted by the AP may be performed on an 80-MHz channel.

Figure 23:
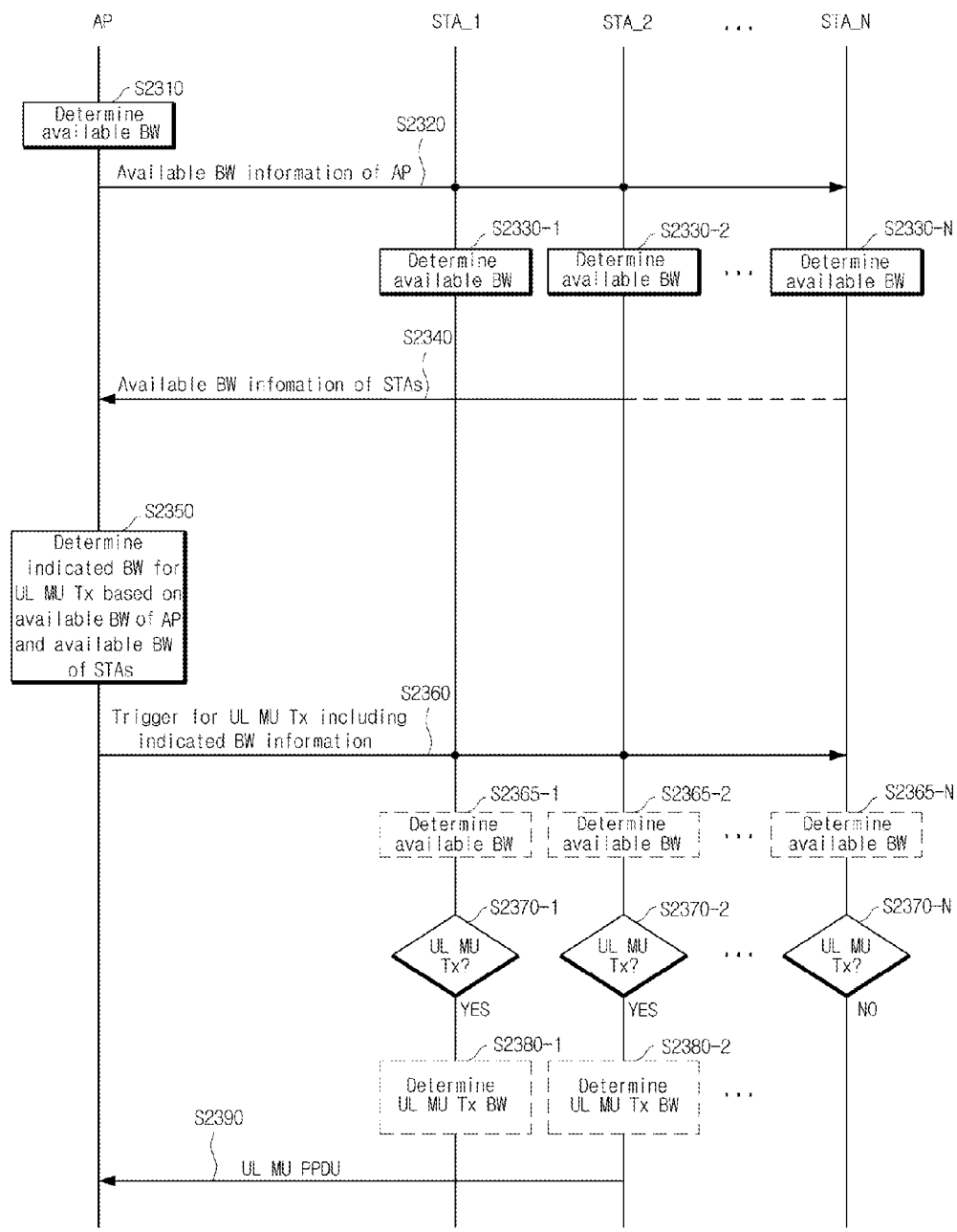
FIG. 23 depicts an exemplary method according to the present disclosure.

FIG. 23 depicts an exemplary method according to the present disclosure.

In step S2310, an AP may determine its available bandwidth. The AP may determine its available bandwidth based on a virtual carrier sensing result, a physical carrier sensing result, etc.

In step S2320, the AP may transmit information indicating the available bandwidth of the AP to a plurality of STAs (e.g., STA_1, STA_2, . . . , STA_N). For example, the information indicating the available bandwidth of the AP may be transmitted in an RTS frame or a UL MU Poll Request frame.

In steps S2330-1, S2330-2, . . . , S2330-N, each of the STAs may determine its available bandwidth. The available bandwidth of the STA may be determined based on a virtual carrier sensing result, a physical carrier sensing result, a bandwidth in which the STA has successfully received a frame, etc.

In step S2340, each of the STAs may simultaneously transmit information about its available bandwidths to the AP. For example, information about the available bandwidth of an STA may be transmitted in a CTS frame or a UL MU Poll Response frame. If the static bandwidth determination method is used, an STA having an available bandwidth different from the available bandwidth of the AP (e.g., an available bandwidth smaller than the available bandwidth of the AP) may not transmit information about its available bandwidth to the AP.

In step S2350, the AP may dynamically determine a bandwidth for UL MU transmission (e.g., an indication bandwidth) based on all of the information about the available bandwidth of the AP and the information about the available bandwidths of the STAs. For example, the AP may determine the indication bandwidth to be the minimum of the available bandwidths of the STAs indicated by the information about the available bandwidths of the STAs received in step S2340, or to be a bandwidth unavailable to some STAs but available to other STAs. If the static bandwidth determination method is used, the indication bandwidth may be determined to be the same as the available bandwidth of the AP (i.e., the same as the available bandwidth of the STAs indicated by the information about the available bandwidths of the STAs received in step S2340).

In step S2360, the AP may transmit a UL MU transmission trigger frame (a UL MU Poll frame or a UL MU Poll Confirm frame) including information about the indication bandwidth to the plurality of STAs.

If the AP determines an indication bandwidth for the UL MU transmission based on the available bandwidth of the AP determined in step S2310 and transmits the UL MU transmission trigger frame to the plurality of STAs without performing steps S2320 to S2350, the plurality of STAs may determine their available bandwidths in steps S2365-1, S2365-2, . . . , S2365-N. An available bandwidth of an STA may be determined based on a virtual carrier sensing result, a physical carrier sensing result, a bandwidth in which a frame has been received successfully, etc.

If steps S2320 to S2350 are performed, steps S2365-1, S2365-2, . . . , S2365-N may not be performed.

Upon receipt of the UL MU transmission trigger information from the AP in step S2360, each of the STAs may determine whether to perform the UL MU transmission based on information about the indication bandwidth included in the trigger frame and information about the available bandwidth of the STA in step S2370-1, S2370-2, . . . , S2370-N. For example, if the available bandwidth of the STA is equal to or larger than the indication bandwidth, the STA may determine to perform the UL MU transmission. On the contrary, if the available bandwidth of the STA is smaller than the indication bandwidth, the STA may determine not to perform the UL MU transmission. In the example of FIG. 23, it is assumed that while STA1, STA2, . . . determine to perform UL MU transmission, STA_N does not perform the UL MU transmission. If an STA determines not to perform the UL MU transmission, the STA may not perform an additional operation.

Each of STA1, STA2, . . . may determine a transmission bandwidth for the UL MU transmission based on the indication bandwidth and the available bandwidth of the STA in step S2380-1 S2380-2, . . . . For example, if the available bandwidth of the STA is equal to or larger than the indication bandwidth, the STA may determine a transmission bandwidth for the UL MU transmission according to the indication bandwidth.

In step S2390, STA1, STA2, . . . may simultaneously transmit a UL MU PPDU to the AP according to the determined UL MU transmission bandwidth.

While the exemplary method has been described with reference to FIG. 23 as a series of operations for simplicity of description, this does not limit the sequence of steps. When needed, steps may be performed at the same time or in a different sequence. All of the exemplary steps are not always necessary to implement the method proposed by the present disclosure.

The foregoing embodiments of the present disclosure may be implemented separately or combinations of two or more of the embodiments may be implemented simultaneously, for the method of FIG. 23.

The present disclosure includes an apparatus for processing or performing the method of the present disclosure (e.g., the wireless device and its components described with reference to FIGS. 1, 2, and 3).

The present disclosure includes software (an operating system (OS), an application, firmware, a program, etc.) for executing the method of the present disclosure in a device or a computer, and a medium storing the software that can be executed in a device or a computer.

While various embodiments of the present disclosure have been described in the context of an IEEE 802.11 system, they are applicable to various mobile communication systems.

What is claimed is:

1. A method for transmitting by a station (STA) to an access point (AP) an uplink Physical layer Protocol Data Unit (PPDU) frame in a wireless local area network, the method comprising:
receiving information on an available bandwidth of the AP from the AP before receiving a trigger frame,
transmitting information on an available bandwidth of the STA to the AP, after receiving the information on the available bandwidth of the AP and before receiving the trigger frame,
receiving the trigger frame including bandwidth information, the trigger frame eliciting a transmission of the uplink PPDU frame including a data unit of the STA and at least one data unit of at least one other STA; and
transmitting the data unit of the STA in the uplink PPDU frame, based on the available bandwidth of the STA and a bandwidth indicated by the bandwidth information included in the trigger frame,
wherein the information on the available bandwidth of the AP is included in a Request-To-Send (RTS) frame or an Uplink Multiple User (UL MU) transmission Poll Request frame, and
wherein the information on the available bandwidth of the STA is included in a Clear-To-Send (CTS) frame or a UL MU transmission Poll Response frame.

2. The method according to claim 1, wherein the bandwidth information included in the trigger frame indicates a bandwidth determined by the AP for the transmission of the uplink PPDU frame.

3. The method according to claim 1, wherein the STA transmits the data unit of the STA in the uplink PPDU frame, when the available bandwidth of the STA is equal to or greater than the bandwidth indicated by the bandwidth information included in the trigger frame.

4. The method according to claim 3, wherein, when the STA transmits the data unit of the STA in the uplink PPDU frame, a transmission bandwidth for the uplink PPDU frame is determined according to the bandwidth indicated by the bandwidth information included in the trigger frame.

5. The method according to claim 1, wherein the STA does not transmit the data unit of the STA in the uplink PPDU frame, when the available bandwidth of the STA is smaller than the bandwidth indicated by the bandwidth information included in the trigger frame.

6. The method according to claim 1, wherein the available bandwidth of the STA is determined by the STA based on at least one of a virtual carrier sensing, physical carrier sensing, or a bandwidth in which the STA successfully received the trigger frame.

7. The method according to claim 1, wherein the information on the available bandwidth of the STA is transmitted simultaneously with information on at least one available bandwidth of the at least one other STA.

8. The method according to claim 1, wherein the bandwidth indicated by the bandwidth information included in the trigger frame is determined by the AP based on the available bandwidth of the AP, the available bandwidth of the STA, and the at least one available bandwidth of the at least one other STA.

9. The method according to claim 1, wherein the available bandwidth of the STA is determined based on a channel idle state of at least one channel of the available bandwidth of the AP.

10. The method according to claim 9, wherein the available bandwidth of the STA is equal to or smaller than the available bandwidth of the AP.

11. The method according to claim 1, wherein the bandwidth information included in the trigger frame is indicated by configuring a seed value of a scrambling sequence of the trigger frame.

12. The method according to claim 1, wherein each channel occupied by the trigger frame includes at least one subchannel allocated for the transmission of the uplink PPDU frame.

13. A method for receiving by an access point (AP) from a plurality of stations (STAs) an uplink Physical layer Protocol Data Unit (PPDU) frame in a wireless local area network, the method comprising:
- transmitting information on an available bandwidth of the AP to the plurality of STAs before transmitting a trigger frame;
- receiving information on the available bandwidth of each of the plurality of STAs from the plurality of STAs, after transmitting the information on the available bandwidth of the AP and before transmitting the trigger frame;
- transmitting to the plurality of STAs the trigger frame including bandwidth information, the trigger frame eliciting a transmission of the uplink PPDU frame including a plurality of data units of the plurality of STAs; and
- receiving the plurality of data units of the plurality of STAs in the uplink PPDU frame, the transmission of the uplink PPDU frame being determined by each of the plurality of STAs based on an available bandwidth of the each of the plurality of STAs and a bandwidth indicated by the bandwidth information included in the trigger frame,
- wherein the information on the available bandwidth of the AP is included in a Request-To-Send (RTS) frame or an Uplink Multiple User (UL MU) transmission Poll Request frame, and
- the information on the available bandwidth of the STA is included in a Clear-To-Send (CTS) frame or a UL MU transmission Poll Response frame.

14. The method according to claim 13, wherein the bandwidth indicated by the bandwidth information included in the trigger frame is determined by the AP based on the available bandwidth of the AP, and the available bandwidth of each of the plurality of STAs.

* * * * *